(12) United States Patent
Kursun et al.

(10) Patent No.: US 9,832,159 B1
(45) Date of Patent: Nov. 28, 2017

(54) SYSTEM AND METHOD FOR A SKILL EXCHANGE PLATFORM USING SOCIAL COMPUTING

(71) Applicant: JPMorgan Chase Bank, N.A., New York, NY (US)

(72) Inventors: Eren Kursun, New York, NY (US); Gene Fernandez, Holmdel, NJ (US); Alex Berson, Dayton, NJ (US); Brian Goodman, Redding, CT (US)

(73) Assignee: JPMorgan Chase Bank, N.A., New York, NY (US)

(*) Notice: Subject to any disclaimer, the term of this patent is extended or adjusted under 35 U.S.C. 154(b) by 369 days.

(21) Appl. No.: 13/975,942

(22) Filed: Aug. 26, 2013

Related U.S. Application Data

(60) Provisional application No. 61/866,190, filed on Aug. 15, 2013.

(51) Int. Cl.
*G06F 15/16* (2006.01)
*H04L 12/58* (2006.01)

(52) U.S. Cl.
CPC ................................... *H04L 51/32* (2013.01)

(58) Field of Classification Search
None
See application file for complete search history.

(56) References Cited

U.S. PATENT DOCUMENTS

| | | | | |
|---|---|---|---|---|
| 8,380,655 | B2 * | 2/2013 | Nevin et al. | 706/60 |
| 8,452,772 | B1 | 5/2013 | Carpio | |
| 8,712,944 | B1 * | 4/2014 | Kim | 706/45 |
| 2001/0034631 | A1 * | 10/2001 | Kiselik | G06Q 30/02 705/2 |
| 2003/0192029 | A1 * | 10/2003 | Hughes | 717/101 |
| 2004/0249713 | A1 | 12/2004 | Gross | |
| 2005/0232423 | A1 * | 10/2005 | Horvitz et al. | 380/255 |
| 2006/0229902 | A1 * | 10/2006 | McGovern et al. | 705/1 |
| 2006/0235969 | A1 * | 10/2006 | Dugan | 709/225 |
| 2009/0235176 | A1 * | 9/2009 | Jayanthi | 715/738 |
| 2011/0302170 | A1 * | 12/2011 | Holostov | G06F 17/30867 707/740 |
| 2011/0313932 | A1 * | 12/2011 | Bhandar et al. | 705/301 |
| 2012/0110087 | A1 * | 5/2012 | Culver et al. | 709/205 |
| 2013/0124278 | A1 * | 5/2013 | Najm | 705/14.11 |
| 2013/0151347 | A1 * | 6/2013 | Baldwin et al. | 705/14.66 |
| 2014/0108121 | A1 | 4/2014 | Norton | |

(Continued)

*Primary Examiner* — Hamza Algibhah
*Assistant Examiner* — Gregory P Tolchinsky
(74) *Attorney, Agent, or Firm* — Hunton & Williams LLP

(57) ABSTRACT

Exemplary embodiments may provide a skill exchange platform to improve collaboration and skill unitization throughout an entity. The skill exchange platform may provide participants an application or widget that enables them to both submit and receive "Asks" from other users based on their expertise. As a part of the system, points may be used as a unifying currency. Participants can volunteer or utilize incentives enabled by a gaming infrastructure and point system. Points may be accumulated by participants by responding to Asks. These points may then be used for a variety of benefits. Embodiments may include a skill exchange game. The goal of the game may be earn points towards corporate rewards as well as recognition through responding to Asks. The game may have a set of rules as well as different modes.

24 Claims, 18 Drawing Sheets

(56) References Cited

U.S. PATENT DOCUMENTS

| | | |
|---|---|---|
| 2014/0214831 A1* | 7/2014 | Chi et al. ............... 707/737 |
| 2014/0244532 A1* | 8/2014 | Budzienski et al. ......... 705/321 |
| 2015/0032751 A1 | 1/2015 | Ting |
| 2015/0286951 A1 | 10/2015 | Rigdon |

* cited by examiner

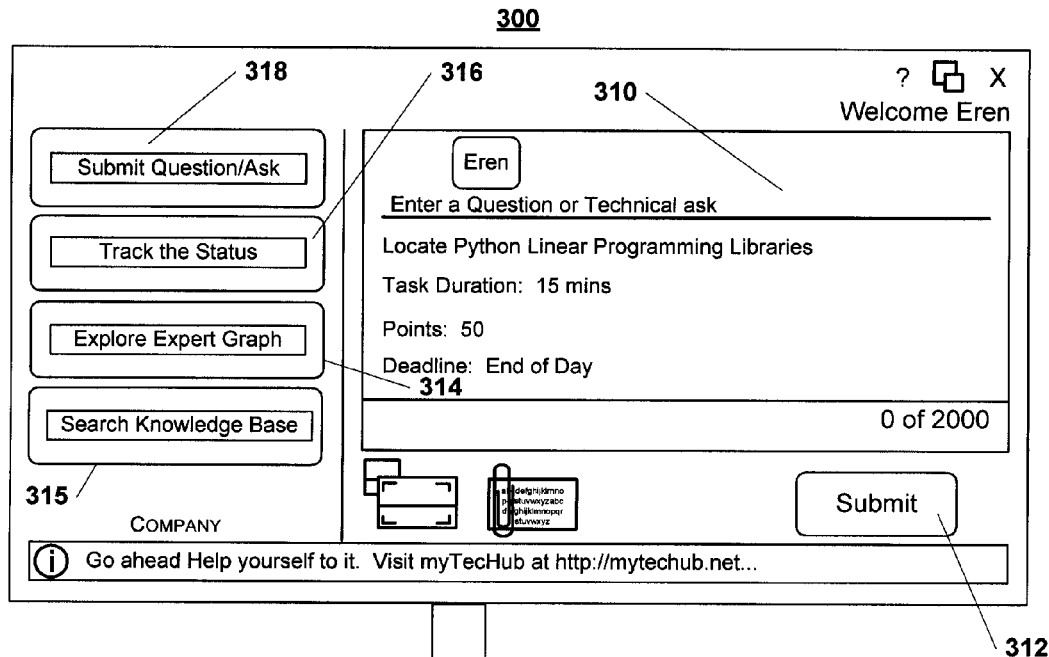
FIG. 3A
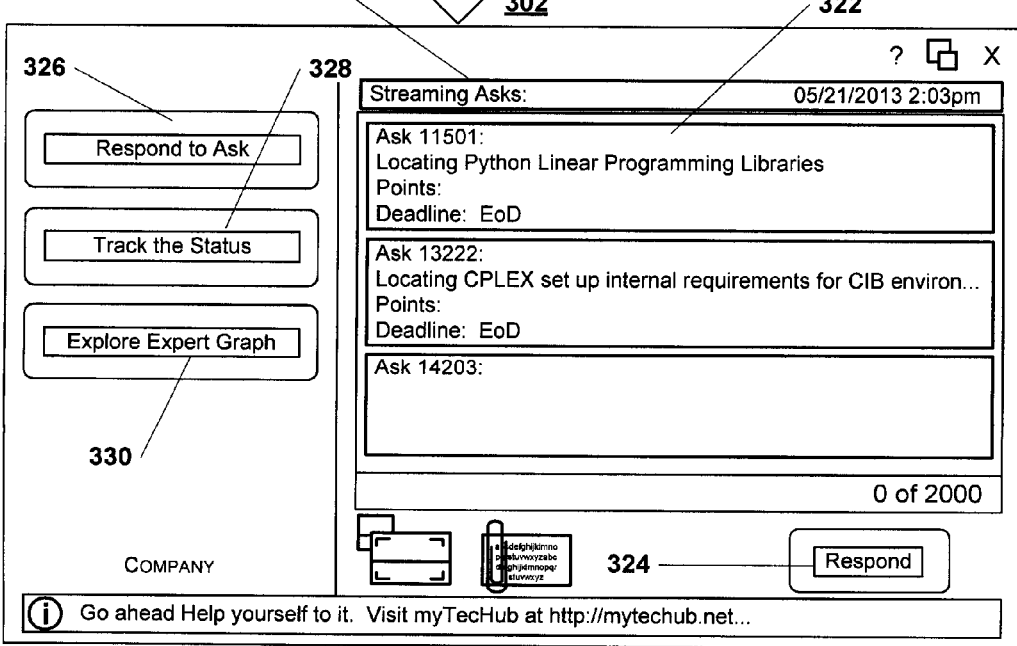

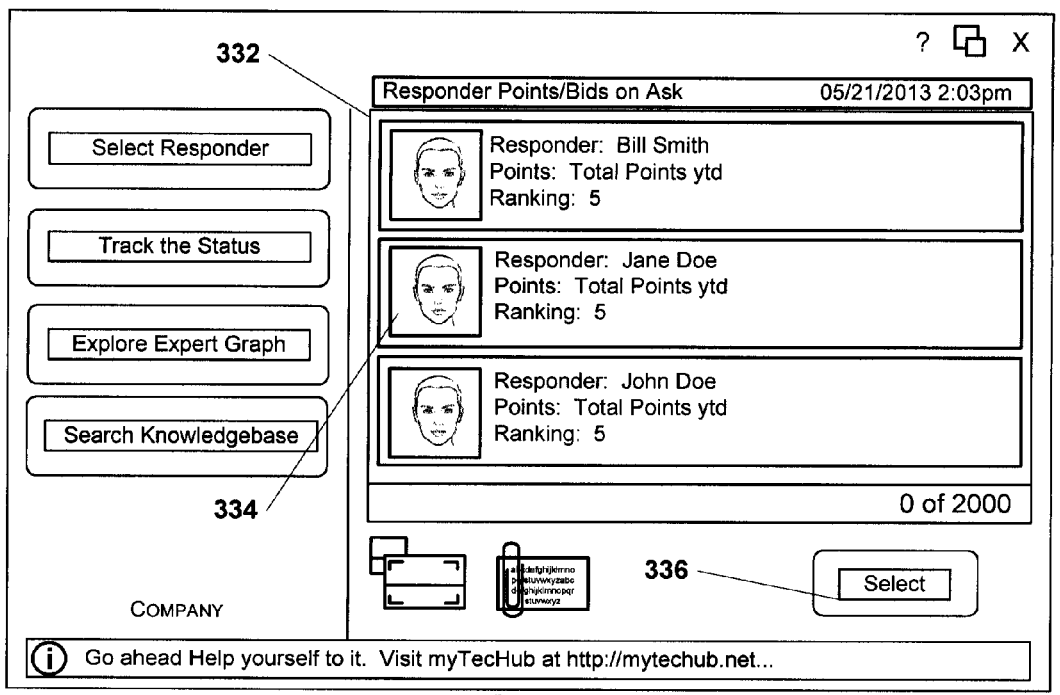
FIG. 3B
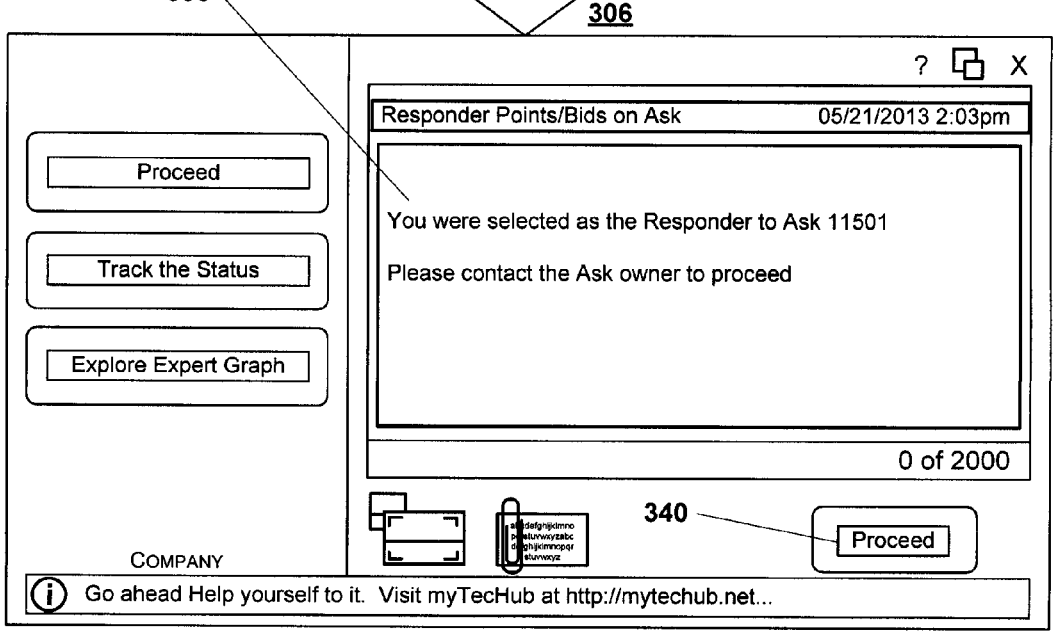

1120

| Task ID | Task ID | Time | Frequency | History/Count | Resource Req |
|---|---|---|---|---|---|
| Task A | Task B | tAB | $F_{AB}$ | $h_{AB}$ | rAB |
| Task A | Task C | tAC | $F_{AC}$ | $h_{AC}$ | rAC |
| ... | ... | ... | ... | ... | ... |

1130

| Cluster ID | Tasks | Time | Frequency | History/Count | Resource Req |
|---|---|---|---|---|---|
| Cluster i | Task ABC | tABD | $F_{ABD}$ | $h_{ABD}$ | rAB |
| Cluster j | Task ABD | tABD | $F_{ABD}$ | $h_{ABD}$ | rAC |
| ... | ... | ... | ... | ... | ... |

FIG. 11B

SYSTEM AND METHOD FOR A SKILL EXCHANGE PLATFORM USING SOCIAL COMPUTING

CROSS REFERENCE TO RELATED APPLICATIONS

This application claims the benefit of U.S. Provisional Application No. 61/866,190, filed Aug. 15, 2013. The contents of which are hereby incorporated by reference in their entirety.

BACKGROUND

In a traditional workplace, a first employee may have a task that needs completed or a question requiring an answer. The request may be emailed to a group or posted to a message board or some other public forum. An expert or other employee familiar with the task or the question is required to assist. However, because of the dynamic nature of the typical workforce and workplace, the first employee can have difficulty in finding others to assist. The others being asked are not required to commit to assist, and the public posting is easy to ignore. In many cases, an escalation may be required through a chain of command to apply pressure for others to assist. This can lead to hostility in the workplace as well as resentment since employees can be assigned to perform tasks they are not happy with.

These and other deficiencies exist.

SUMMARY OF THE PREFERRED EMBODIMENTS

An exemplary embodiment includes a computer implemented method including: receiving, electronically, a submission comprising a request from a requester; routing the submission to one or more potential responders through an electronic stream; receiving, electronically, a response from one or more potential responders; routing the response to the requester; and selecting the response for the submission.

An exemplary embodiment includes a system including one or more end user devices, wherein the end devices comprising computing devices; one or more servers, communicatively coupled to the one or more end user devices through a network; one or more databases, communicatively coupled to the one or more servers and the one or more end user devices, comprising: skill exchange information, user profiles, request profiles, historical requests, and policies that guide creation, distribution, response, security, compliance, and privacy of a request; the one or more servers having at least one computer processor and computer memory comprising computer-readable instructions which when executed by the at least one processor cause the at least one processor to perform the steps comprising: receiving a submission comprising the request from a requester that originates from one of the one or more end user devices; routing the submission to one or more potential responders through an electronic stream such that the electronic stream is displayed in a streaming interface and the routing is to one or more of the one or more end user devices associated with the one or more potential responders; receiving a response from one or more potential responders; routing the response to the requester; and selecting the response for the submission.

In exemplary embodiments, the preceding method may be performed using a system with a processor and a memory comprising computer-readable instructions which when executed by the processor cause the processor to perform the method steps.

These and other embodiments and advantages of the preferred embodiments will become apparent from the following detailed description, taken in conjunction with the accompanying drawings, illustrating by way of example the principles of the various exemplary embodiments.

BRIEF DESCRIPTION OF THE DRAWINGS

FIGS. 3A and 3B depict interfaces for submitting and responding to an Ask in accordance with an exemplary embodiment.

FIG. 11B depicts a look-up table and cluster library according to exemplary embodiments.

DETAILED DESCRIPTION OF THE PREFERRED EMBODIMENTS

Figure 1:
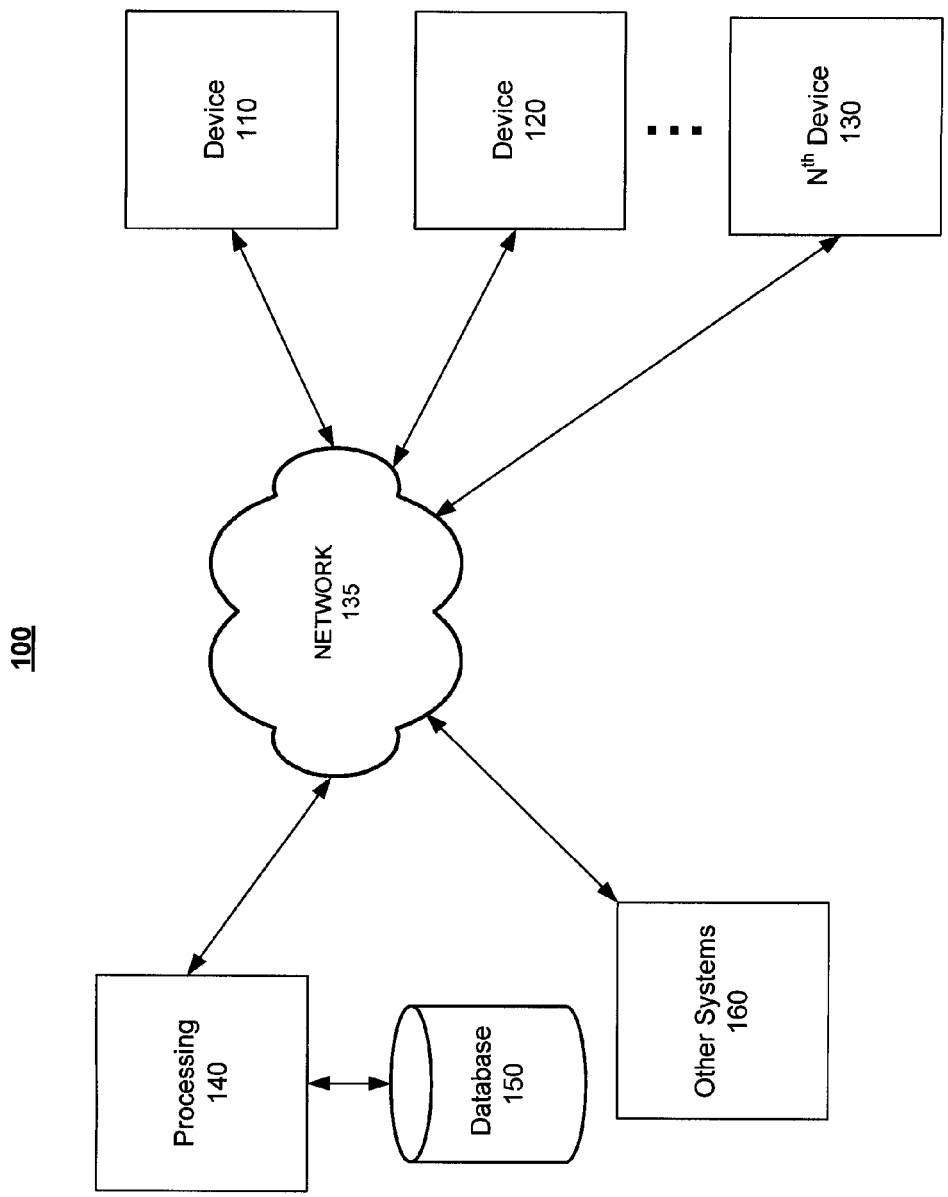
FIG. 1 is a diagram of a system in accordance with an exemplary embodiment.

It will be readily understood by those persons skilled in the art that the embodiments of the inventions described herein are capable of broad utility and application.

Accordingly, while the invention is described herein in detail in relation to the exemplary embodiments, it is to be understood that this disclosure is illustrative and exemplary of embodiments are described to provide an enabling disclosure. Accordingly, the disclosure is not intended to be construed to limit the embodiments or otherwise to exclude any other such embodiments, adaptations, variations, modifications and equivalent arrangements.

The following descriptions are provided of different configurations and features according to exemplary embodiments. These configurations and features may relate to providing financial services to customers. While certain nomenclature and types of applications/hardware are described, other names and application/hardware usage is possible and the nomenclature provided is done so by way of non-limiting examples only. Further while particular embodiments are described, it should be appreciated that the features and functions of each embodiment may be combined in any combination as is within the capability of one of ordinary skill in the art. The attached Figures provide additional details of the various embodiments. It should also be appreciated that these exemplary embodiments are provided as non-limiting examples only.

While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. For example, some of the modules or functionality associated with the modules may be supported by a separate application or platform. Other implementations and architectures may be realized. It should be appreciated that embodiments described may be integrated into and run on a computer, which may include a programmed processing machine which has one or more processors. Such a processing machine may execute instructions stored in a memory to process the data and execute the methods described herein.

As noted above, the processing machine executes the instructions that are stored in the memory or memories or persistent or non-transitory data storage devices to process data. This processing of data may be in response to commands by a user or users of the processing machine, in response to previous processing, in response to a request by another processing machine and/or any other input, for example. As described herein, a module performing functionality may have a processor.

Exemplary methods are provided by way of example herein, as there are a variety of ways to carry out the method disclosed herein. The methods depicted in the Figures may be executed or otherwise performed by one or a combination of various systems, such as described herein. Each block shown in the Figures represents one or more processes, methods, and/or subroutines carried out in the exemplary methods. Each block may have an associated processing machine or the blocks depicted may be carried out through one processor machine. Furthermore, while the steps may be shown in a particular order, it should be appreciated that the steps may be conducted in a different order.

Systems and methods according to exemplary embodiments may provide a skill exchange application and/or a flexible skill exchange platform to improve collaboration and skill unitization throughout an entity. The system may be a completely self-configuring non-centralized system that requires no centralized control or escalation. The entity may be a corporation or business. For example, the entity may be a financial institution. Financial institution, as used herein, may include institutions that provide financial services to their members or customers. Financial institutions may include, but are not limited to banks, credit unions, trust companies, mortgage loan companies, insurance companies, investment banks, underwriters, and brokerage firms. It should be appreciated that the embodiments described herein may be used with a variety of industries and businesses and are not meant to be confined to financial institutions.

The skill exchange system may provide participants an application or widget that enables them to both submit and receive "Asks" from other users based on their expertise. For example, this may be referred to as a skill exchange application or app. As a part of the system, points may be used as a unifying currency. Participants can volunteer or utilize incentives enabled by a gaming infrastructure and point system. Participants may be employees of the entity. Accordingly, users can submit "Asks" through a dedicated button-like application or widget in the system. Asks may then get distributed to an "Expert Graph" where experts respond to the "Ask" in exchange for points. By customizing the points to the specific Ask the system may inherently match the time/effort level. A "gameified" user interface may provide easy to use features to submit an Ask, as well as respond to streaming Asks that are displayed for each participant for minimum response times. By customizing credits to the importance of the Ask, resource/expert utilization may be prioritized.

As described above, points may be accumulated by participants by responding to Asks. These points may then be used for a variety of benefits. A wide range of user incentives for both volunteering or competitive modes may be offered to make the skill exchange platform more appealing to participants. For example, the points may be used to establish skill exchange rankings or tiers, a skill exchange hall of fame, and as a criteria for annual evaluations and bonus consideration. In some embodiments, participants can select to volunteer activity instead of receiving points or volunteer for a point exchange. The point exchange may facilitate the use of points as a currency for generate additional Asks in the system. The points may be exchanged for other rewards through a human resources system. For example, top performers may receive corporate rewards and/or discounts as part of an employee or corporate discount program. The volunteer activity may generate credit towards an entities volunteer program. For example, volunteering for an Ask to assist a new hire may be used as credit towards an entity's outreach or mentoring program.

Embodiments may include a skill exchange game. The goal of the game may be earn points towards corporate rewards as well as recognition through responding to Asks. The game may have a set of rules as well as different modes.

For example, single player mode rules may include, for the owner of the Ask:

Create an Ask using the skill exchange app;

Explain the Ask in sufficient detail through the app;

Assign points and deadline to Ask—submit to the skill exchange system;

Points and deadlines can be adjusted by the skill exchange system using global skill exchange data;

Select a responder from the list of responders (this can be automatically set in the app through policies (such as pick the First to Respond, or Highest ranking to Respond, etc.);

User can scan the list of responders and select without or overwriting the automatic selection process;

Confirm completion of the Ask through the system;

If the task is not completed to satisfaction, the owner has the option to extend the duration or pick another responder to restart the process; and If the responder objects, a randomly selected expert gets assigned to evaluate the Ask and Response to decide whether the response is sufficient. This panel may select to assign points to the responder depending on the outcome of this process.

Responder rules may include:

Select an Ask from the streaming list in the skill exchange app;

Respond to the Ask to complete the Ask within the specified timeframe;

Engage team members or collaborators to ask for further help and share points (through spawning a related Ask);

Confirm with owner of the Ask the ask is completed to satisfaction; and

Collect points over time to achieve badges and honors (described below).

For example, competitive mode rules may include:

Select an opponent through the skill exchange app;

Agree on a deadline and selection of collaborative/non-collaborative mode;

Respond to Asks until the deadline to earn points; and

Player with highest points collected during the duration gets 2× the points.

It should be appreciated that the above rules are meant to be exemplary and non-limiting.

In some embodiments, there may be a multi-player game where participants can play with other players. Teams may be created to allow responders to collectively respond and gain points for the entire team.

Rewards may include badges and honors which may be associated with the participant in an employee directory or website. The badges and honors earned may be displayed in the directory or on the website. The entity as a whole may have a set of badges and honors that are used throughout the entity. The badges and honors may be customized by and/or created by different departments or line of businesses that are part of an entity. Special interest groups may create their own badges and honors. The badges and honors may be a way to track participant points.

For example, a particular special interest group may have the following badge structure:

Each participant may start with a New Member badge and may be given 100 points beginner credit. The user earns custom rewards for each badge of honor accomplishment.

Badges are displayed in the employee phone book.

1000 points: Expert Badge:
  1% additional Employee Discount;
  Access to selected external resources (e.g., paid research tools); and
  Corporate—Logo merchandize discounts.

5000 points: Distinguished Expert Badge:
  1% additional Employee Discount (and an extended vendor list); and
  Auto performance feedback created by Skill Exchange System.

10000 points: All Star Expert Honor:
  2% additional Employee Discount (and an extended vendor list); and
  Local conference attendance approval (e.g., IEEE, ACM, Professional Interest Community).

50000 points: Hall of Fame Expert Honor:
  3% additional Employee Discount (and an extended vendor list);
  Invitation to meetings with External Experts (selected group of Professors, Internal External Execs, Mentors); and
  International conference/class attendance approvals.

The application or widget may be capable of being used on both mobile and desktop computing platforms. There may be different versions to accommodate these different operating systems. In some embodiments, the application may be pushed by the entity and installed across all participant's computing platforms to facilitate wide accessibility and use of the application.

The Ask system may use resources outside of an entity to find the correct expertise. For example, the Ask system may be connected to vendor networks, academic networks, and external experts. The Ask request may be routed to those networks are required to find the correct expertise if it lies outside of the entity. The participant may choose this option when constructing a request or upon receiving negative or unsatisfactory responses from internal participants to the Ask. Accordingly, exemplary embodiments may encompass a larger skill exchange network.

The system may enable skill exchange efficiency significantly compared to traditional methods of public requests for help. The improvement may be more significant in highly dynamic workforces, for cases where the skills are outside the requesting department or line of business or for new/less connected employees.

The resulting enterprise wide live skill exchange platform may be used to create a knowledgebase from the successful responses to Asks. Each Ask and successful response may be stored in the system categorized and provided to the user through a natural language based search system when a new ask is submitted.

A skill exchange system may incorporate machine learning techniques to identify the right set of potential responders for each Ask. In addition an entity-wide skill exchange map can be created with run-time source/sink, task and priority data can be used for variety of uses such as hiring and team building decisions, identifying on-demand, or missing skill sets, as well as establishing an entity-wide Ask knowledge base.

Exemplary embodiments may further promote the identification of topic experts in individual fields. Accordingly natural clustering of skill groups where high connectivity occurs due to frequent ask/response pairs may be identified and formed. For example, a firm wide NoSQL special interest group may be identified and formed where one previously did not exist. Employees get automatically ranked for skills and expertise through the response to asks.

For any rare skill with high importance, a list of potential responders may be identified by the system. Such responders and skills may be automatically ranked against other skills in the system. When the system identifies that these skills are rare and important skills corresponding Ask points will be adjusted to reflect this. Such users may be marked by the skill exchange system due to their highly important skills/knowledgebase.

The dynamic updates in the skill exchange platform may indicate emerging topics that will guide hiring decisions. If the skill exchange platform experiences a flux of Asks in an emerging technology related topic, this may be used to guide hiring decisions for personnel with corresponding expertise or entering into an agreement with a vendor or other third party expert to provide this skill or expertise.

Similarly, text analytics can be used to dynamically track the emerging topics, location of technical problems, sink/source profiles to dynamically allocate resources across the firm. If the networking Asks are spiking in the datacenters in location A, and all the responses are coming from the networking experts in datacenters in location B, the resulting team structure may be changed such that the experts with the skills are moved to the locations with highest skill demand.

The skill exchange platform may further be used as an automatic team building/assignment tool where given a set of tasks or skills a number of users with complementary skill sets can be identified across the firm.

FIG. 1 is a system according to exemplary embodiments. System 100 may provide various functionality and features associated with the embodiments. More specifically, system 100 may include a device 110, a second device 120, and an Nth device 130, a network 135, a processing module 140, a database 150, and other systems 160.

According to exemplary embodiments, the system 100 may be configured to carry out the methods as described herein. The system 100 may have device 110 associated therewith. A second device 120 and an Nth device 130 may be further associated with the system 100. The devices 110, 120, and 130 may each be a processing machine. Each device 110, 120, and 130 may include software and/or modules to implement the methods described herein according to exemplary embodiments. Each device 110, 120, and 130 may provide processing, display, storage, communications, and execution of commands in response to inputs from a user thereof and respond to requests from the software and/or modules. It should be appreciated that even though the devices 110, 120, and 130 may be referred to in the subsequent description, the system 100 may use any combination of these devices ranging from one device 110 to multiple devices 110, 120, and 130.

The devices 110, 120, and 130 may each serve as a client side. Each device 110, 120, and 130 may be a "fat" client, such that the majority of the processing may be performed on the client. Alternatively, the device 110, 120, and 130 may each be a "thin" client, such that the majority of the processing may be performed in the other components of the system 100. The devices 110, 120, and 130 may be configured to perform other functions and processing beyond the methods described herein. The devices 110, 120, and 130 may each be a part of a larger system. The devices 110, 120, and 130 may be multi-functional in operation. The devices 110, 120, and 130 may each support the operation and running of one or more applications or programs.

Each device 110, 120, and 130 may have a display and an input device associated therewith. The display may be monochrome or color. For example, the display may be a plasma, liquid crystal, or cathode ray tube type display. The displays may be touch screen type displays. The devices 110, 120, and 130 may have more than one display. The multiple displays may be different types of displays. The display may have sub-displays there on. For example, the device 110, 120 and 130 may have a large display surface. The display for the user interface may occupy a portion or less than the whole of the large display surface.

The input device may be a single device or a combination of input devices. For example, the input devices may include a keyboard, both full-sized QWERTY and condensed, a numeric pad, an alpha-numeric pad, a track ball, a touch pad, a mouse, selection buttons, and/or a touch screen. As described above, the display may serve as an input device through using or incorporating a touch screen interface. The devices 110, 120, and 130 may include other devices such as a printer and a device for accepting deposits and/or dispensing currency and coins.

The device 110, 120, and 130 may have one or more cameras, optical sensors, or other sensing devices. The sensors may be computer controlled and may capture digital images.

According to some embodiments, the devices 110, 120, and 130 may be portable electronic devices or mobile electronic devices. The user may interact with the portable electronic device through various input devices (not shown). For example, the portable electronic device may have a display screen to convey information to the user. The display may be a color display. For example, the display may be a Liquid Crystal Display ("LCD"). The portable electronic device may have one or more input devices associated with it. For example, the portable electronic device may have an alpha-numeric keyboard, either physical or virtual, for receiving input. The portable electronic device may have a QWERTY style keyboard, either physical or virtual. The portable electronic device may have a pointing device associated therewith, such as, for example, a trackball or track wheel. The portable electronic device may receive inputs through a touch screen or other contact interface. In some embodiments, gesture based input may be used. A combination of input types may be used. As described above, the portable electronic device may have communication capabilities over both cellular and wireless type networks to transmit/receive data and/or voice communications.

The portable electronic device, by way of non-limiting examples, may include such portable computing and communications devices as mobile phones (e.g., cell or cellular phones), smart phones (e.g., iPhones, Android based phones, or Blackberry devices), personal digital assistants (PDAs) (e.g., Palm devices), laptops, netbooks, tablets, or other portable computing devices. These portable electronic devices may communicate and/or transmit/receive data over a wireless signal. The wireless signal may consist of Bluetooth, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and/or systems suitable for transmitting and receiving data from the portable electronic device. The portable electronic device may use standard wireless protocols which may include IEEE 802.11a, 802.11b, 802.11g, and 802.11n. Such portable electronic devices may be Global Positioning System (GPS) capable. GPS is a satellite based system which sends a signal allowing a device to define its approximate position in a coordinate system on the earth. That is, the portable electronic device may receive satellite positioning data and display the location on the earth of the portable electronic device using GPS. Other location systems may be used. The portable electronic device may include one or more computer processors and be capable of being programmed to execute certain tasks.

The device 110, 120, and 130 may establish communications with other parts of the system 100 over a network 135. Upon successful initiation of communications between the and the network 135 and another part of the system 100, such as, for example, processing 140 and database 150, data may be exchanged between device 110, 120, and 130 and the particular element over the network 135. Data may be transmitted from device 110, 120, and 130. Data may be transmitted from the other part of the system 100 to the device 110, 120, and 130.

The devices 110, 120, and 130 may have a log-in device associated therewith. The log-in device may be used to allow access to the device. The log-in device may require a particular input or it may accept a combination of inputs. The input may serve as an authentication of the user to the device 110, 120, or 130 and, in some embodiments, the system 100 in general. Various authentication or log-on systems and methods may be used. For example, these methods and systems may include entering a password or PIN (Personal Identification Number) or using a card to log-on, either via swiping the card through a reader, such as a magnetic stripe reader or a smart chip reader, or through a radio frequency system (which may require that the card be placed in proximity to an appropriate reader (i.e., a contactless system), such as, for example, RFID (Radio Frequency Identification) or NFC (Near Field Communications). It should be appreciated that the card may include a combination of a magnetic stripe, a smart chip, and radio frequency. Further, the use of the card is exemplary only and the card may include fobs, stickers, and other devices. Biometrics may be used, such as fingerprints, facial recognition, speech recognition, palm vein scan, or retinal scan. A combination of these systems may be used. Biometrics may be used in addition to other log-in methods and systems.

The devices 110, 120, and 130 may be communicatively coupled to the network 135. Accordingly, the devices 110, 120, and 130 may be geographically dispersed. Conversely, two or more of devices 110, 120, and 130 may be located in close proximity. For example, the devices may be located within or near an office complex. Wherever the location of the device 110, 120, and 130, it may still be able to communicatively couple with the network 135 and the components of the system 100.

In some embodiments, the devices 110, 120, and 130 may be other types of computing platforms, such as, for example, a desktop computer or a laptop computer. The devices 110, 120, and 130 may be a combination of computing devices.

The devices 110, 120, and 130 may each be remotely accessible. Remote access may be used to configure, troubleshoot, and wipe the contents of the device, for example.

Network 135 may be a computer based network, with one or more servers and/or computer processors. For example, network 135 may be the Internet or a network connected to the Internet. The network 135 may be a satellite or cellular based network. Information and data may be exchanged through the network 135 between the various components of the system 100. In alternative embodiments, the network 135 may be a local area network within the financial institution that may be connected to or interface with the Internet. It should be appreciated that the network 135 may be a combination of local area networks, wide area networks, and external networks, which may be connected to the Internet.

The processing module 140 may be communicatively coupled to the network 135. The processing module 140 may perform operations associated with the establishment, configuration, and application of the programs to perform the methods accordingly to exemplary embodiments. The processing module 140 may consist of one or more servers and/or general purpose computers, each having one or more computer processors associated therewith.

The processing module 140 may have a database 150 communicatively coupled thereto. The database 150 may contain data and information used by the system 100. For example, the database 150 may store data relating to exemplary embodiments. Additional information maybe contained therein related to the operation and administration of the system 100. The database 150 may include any suitable data structure to maintain the information and allow access and retrieval of the information. For example, the database may keep the data in an organized fashion. The database 150 may be a database, such as an Oracle database, a Microsoft SQL Server database, a DB2 database, a MySQL database, a Sybase database, an object oriented database, a hierarchical database, a flat database, and/or another type of database as may be known in the art that may be used to store and organize rule data as described herein.

The database 150 may be stored in any suitable storage device. The storage device may include multiple data storage devices. The multiple data storage devices may be operatively associated with the database 150. The storage may be local, remote, or a combination thereof with respect to the database. The database 150 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The database may have back-up capability built-in. Communications with the database 150 may be over a network, such as the network 135, or communications may be over a direct connection between the database 150 and the processing module 140, as depicted in FIG. 1. Data may be transmitted and/or received from the database 150. Data transmission and receipt may utilize cabled network or telecom connections such as an Ethernet RJ15/Category 5 Ethernet connection, a fiber connection, a traditional phone wireline connection, a cable connection or other wired network connection. A wireless network may be used for the transmission and receipt of data.

According to some embodiments, the processing module 140 may be a server.

It should be further appreciated that the processing module 140 may be part of the network management for the overall system 100. As described herein, the system according to exemplary embodiments may be a non-centralized system and thus the devices 110, 120, and 130 may directly communication and interface with one another without the needs for the processing module 140 to perform tasks. The processing module 140 may perform monitoring and storage of data associated with the system 100.

The system 100 may have other systems 160 associated therewith. These other systems 160 may include various data collection and support systems to carry out a variety of functions. The systems 160 may include equipment and other assets of the entity.

Figure 2:
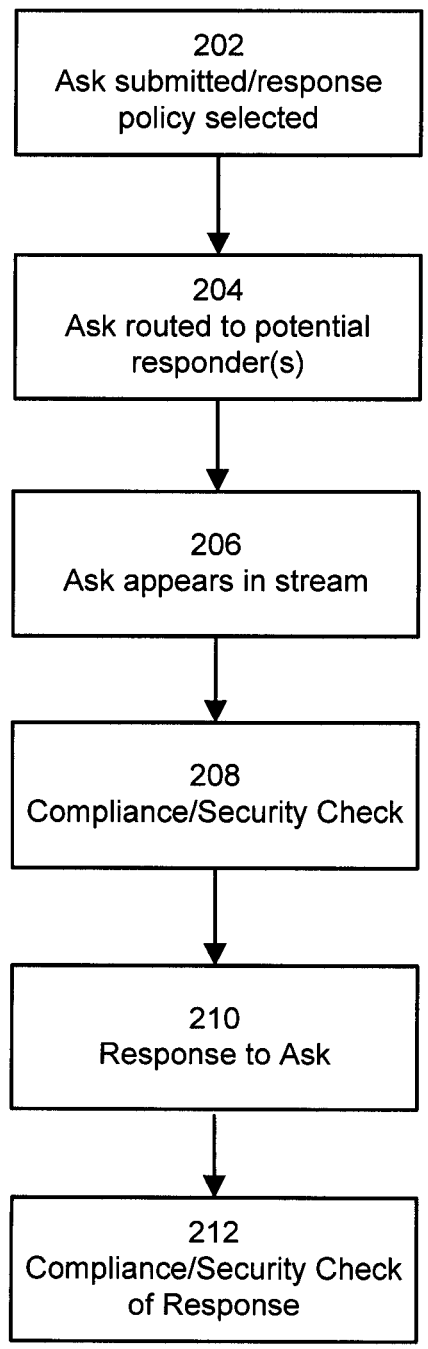
FIG. 2 is a flow chart of a method for a skill exchange platform in accordance with an exemplary embodiment.

FIG. 2 depicts a flow chart of a method for a skill exchange platform according to exemplary embodiments.

At block 202, an Ask is submitted and a response policy is selected. A participant may submit the Ask. The participant may be a system user. The participant may be an employee of an entity. For example, the participant may be an employee of a financial institution. The Ask may be generated by the firm or entity instead of by a specific employee or person.

The Ask may be a request for assistance or a task, for example. The Ask may be any item for which the participant requires additional assistance or help with. For example, the Ask may be a request for information about overseas trading policies for hard currency.

According to exemplary embodiments, the Ask may be submitted through an interface of an application or widget. The application or widget may be installed and running on a computing platform. For example, the participant may open the application on a tablet computing device or other portable computing device. The interface may be a graphical user interface.

The Ask may contain certain information about the task. For example, the task information may include estimated effort, points to be awarded to the responder, and the deadline. Other information may be included such as a task description. Security restrictions and confidentiality specifications may be included. In some embodiments, the participants may release identity information while in other embodiments the identification of the originator and even the responders may be partially or fully shielded from discovery. In these embodiments, the identities of participants involved may be made anonymous.

As part of the Ask, the participant may select different policies governing the response to the Ask. For example, the policies may include:

First to Respond: First user that responds through to the Ask gets the assignment;

Point based Bidding: Responders signal back potential points requested for the Ask. Participant selects accordingly; and Rankings Highest ranking responder (in terms of points accumulated) gets the assignment (if he/she responds within a predefined period of time).

It should be appreciated that other policies may be possible. For example, geographic locations, time zones, and other information can be used in selection policies. In some embodiments, the participant may define a custom policy for the response. In other embodiments, no policy may be selected. The participant may then gather responses and select based on their own judgment. In some embodiments, the system may have a default policy that is applied if none is selected. In other embodiments, the system may automatically apply the policy and notify the participant of the result. The policy may be specified to Ask for participation by individuals or groups or a combination of both.

A corresponding game may be selected for the response policy, as described above. The participant may select from standard game formats and make customizations to the rules.

At block 204, the Ask is routed to potential responder(s). The Ask may be routed by the system to a list of one or more potential responders. The routing may be guided by the graph based back-end of the skill exchange system as described in the upcoming figures. The participant may select a list of specific persons to whom the Ask is routed. In some embodiments, the participant may select a group listing or a particular channel to route the ask. Potential responders may subscribe to different channels associated with their expertise.

At block 206, the Ask appears in a stream. The Ask may appear in a stream of Asks on the application of the potential responders to whom the Ask is transmitted.

At block 208, corporate security compliance software or teams may check the Ask and make edits and restrict the scope.

At block 210, a response to Ask is submitted. One or more of the potential responders may user their application or widget on their own computing platform. The response may be routed to the participant who submitted the Ask for selection.

At block 212, security and compliance checks may be performed on the response. Depending on the security restrictions, the responders may be allowed to complete the Ask fully or only provide descriptions or input to a particular portion or portions without having access to data. In one embodiment, the Asks may be routed to external entities, such as, for example, vendors, external expert committees, academia, etc. In these cases, similar restrictions may apply.

FIGS. 3A and 3B depict exemplary interfaces for submitting and responding to an Ask. The interfaces 300, 302, 304, and 306 depicted in FIGS. 3A and 3B may be displayed on a computing device that is part of the system 100 as described above.

In the interface 300, a requestor enters an Ask in the section 310. Basic information may be required such as estimated effort, points awarded to the responder, and a deadline as shown. The section 310 may be formatted for entry of the ask with particular fields to which entries are made by the requestor. The Ask may be submitted with the button 312. The submission may place the Ask into a Skill Exchange System according to exemplary embodiments. Following submission, the flow may progress to the interface 304. The interface 300 may further have buttons 314, 316, and 318 for exploring an expert graph, tracking status, and submitting a question ask, respectively. A further search button 315 may be included to search similar requests from historical records. Exemplary embodiments, may provide access to a knowledgebase consisting of the historical Asks and successful/unsuccessful responses that might be searched and queried through natural language and other forms. This may assist a requestor in formulating an Ask.

The interface 302 may be displayed on a user's computing device. For example, the computing device may include a personal computer, a workstation, or a mobile device such as smart phone, or wearable electronics, such as a smart watch or smart glasses. The user may be a potential responder. The interface 302 may have a streaming Ask section 320 that displays Asks in real time, as they are received into the Skill Exchange System, and is dynamically updated as new Asks are received. The user may select from a list of filters to control the streaming Asks. Such filters may include Asks that are above specified threshold, asks that have deadlines >48 hours, etc. The user may input custom filters or select a machine learning based system that filters Asks similar to the previously answered successful Asks. The Asks displayed in the streaming section may be those Asks which are sent to the potential responder. A potential responder may select an Ask in the stream, such as the Ask 322, and actuate the respond button 324 to respond, if interested in the particular Ask. The interface 302 may have buttons 326, 328, and 330 for responding to an Ask, tracking status, and exploring an expert graph, respectively.

In FIG. 3B, the process continues with the interface 304. The requester for the Ask (i.e., who submitted the original Ask in FIG. 3A in the section 310 as described above) may receive a listing of responders in the section 332. It should be appreciated that the interface 304 may be same interface as the interface 300, with another window or interface displayed. From the listing of responders 332, the user may select a particular responder, such as the responder 334. The button 336 may be used to select the chosen responder for the Ask.

Once selected, the selected responder 334 may receive a notification 338 in the interface 306. The responder 334 may select the proceed button 340 to accept the task. It should be appreciated that the interface 306 may be the same interface as the interface 302, with another window displayed. In some embodiments, the interfaces depicted in FIGS. 3A and 3B may be the same interface but shown in different configurations and states.

The interfaces 300 and 302 may be open and displayed on a computing device of the user. These interfaces may be minimized or running in the background of the computing device. In the case of the interface 302, the streaming Ask section 320 may be displayed when a new Ask is added to the stream. For example, the interface 302 may become active and move forward into the display of the computing device. In some embodiments, the streaming Ask section 320 may be the default display. However, the user may alter this default setting. The notification 336 may be displayed upon receipt of a new notification. For example, if the streaming Ask section 320 is active and displayed, and a new notification is received, the notification 336 may be displayed in place of the streaming Ask section 320. Likewise, the listing of responders 332 may be displayed when a new responder responds to an Ask associated with the user and this may display other sections that are active, such as the Ask submittal section 302.

Figure 4:
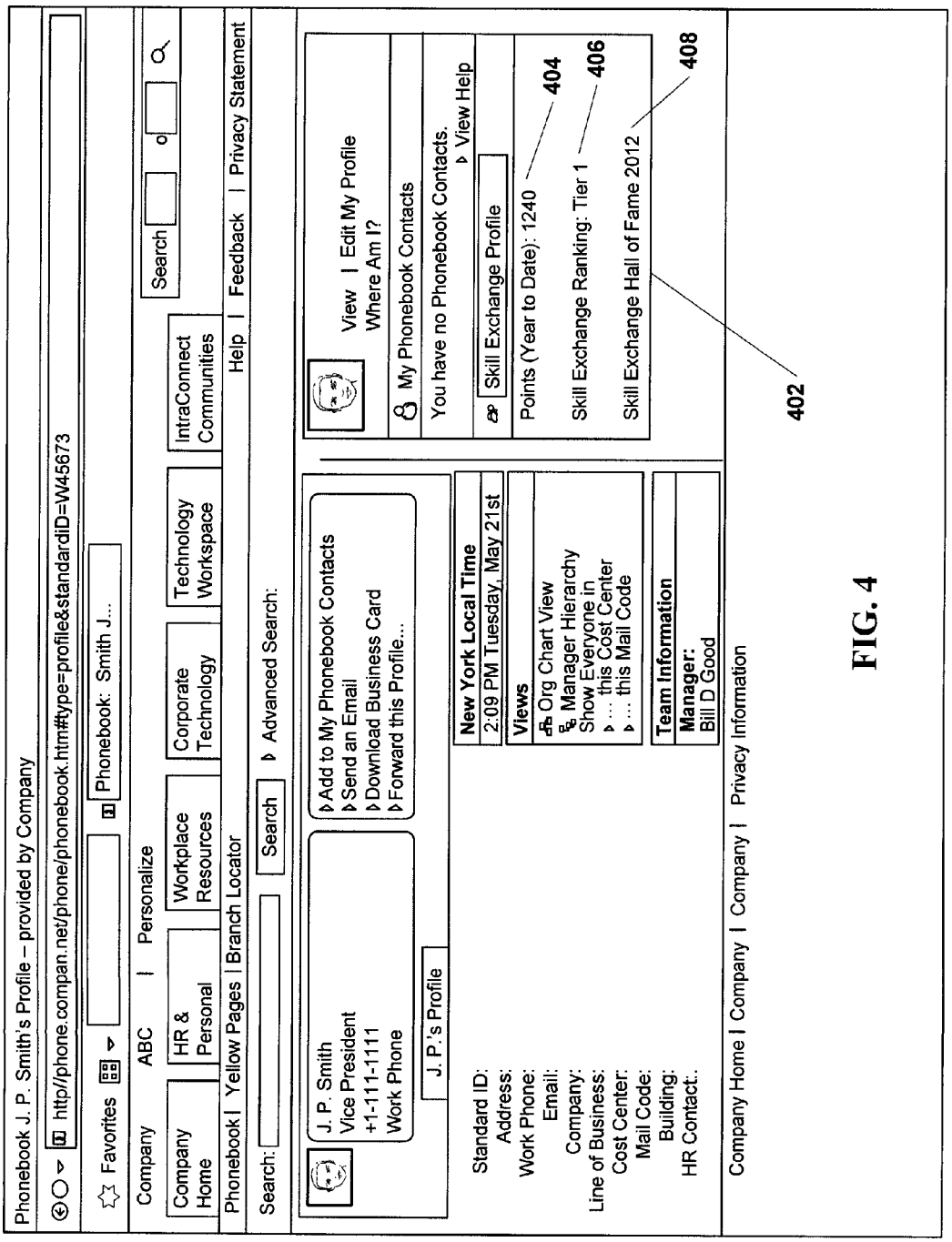
FIG. 4 depicts a phonebook entry with a skill exchange profile according to an exemplary embodiment.

FIG. 4 depicts a phonebook entry with a Skill Exchange Profile according to an exemplary embodiment. The phonebook entry of FIG. 4 may be a part of a company or enterprise directory. The company directory may be accessible through a network interface. As part of the phonebook entry, a Skill Exchange Profile 402 may be included. The Skill Exchange Profile 402 may include points accumulated to date 404, a skill exchange ranking 406, and a banner 408 that includes awards the person has. This information may be visible to all users of the phonebook at the company. In some embodiments, this information may be kept private from the public or only visible to selected users. The Skill Exchange Profile 402 is meant to be exemplary only, as other embodiments and arrangement are possible.

Figure 5A:
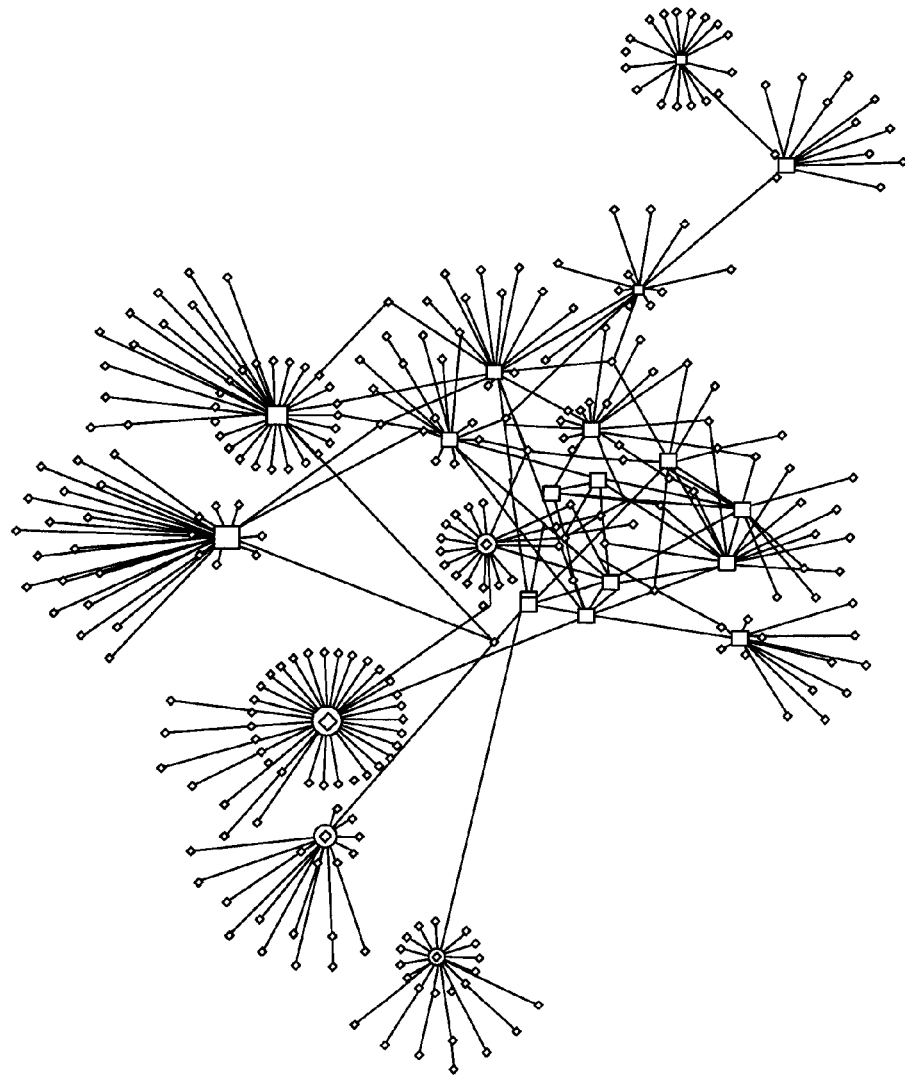
FIG. 5A depicts a graph of skill exchange system interconnections according to an exemplary embodiment.

FIG. 5A depicts a graph of skill exchange system interconnections according to an exemplary embodiment. The graph 500 may represent the interactions amongst participants in an entity, such as a corporation. The graph 500 is meant to be exemplary only, as a variety of other graphs are possible to display the interaction data. The data collected through the skill exchange system according to exemplary embodiments may be used to provide data for post-processing. Different graph algorithms may be used to extract insights from expert graphs, connectivity, source/sink behavior, skill characteristics, and temporal characteristics, amongst others. In some embodiments, an entity-wide skill exchange graph may be available in real-time, including source/sink, importance, and response time information. From such graphs, such as the graph 500, natural clustering of skill groups may be observed where high connectivity occurs due to frequent Ask/response pairs. This may enable identification of Asks with high importance/points where only a limited set of responders are found. This may indicate rare and coveted skills that may be marked as such by the system. The graphs may further aid in identifying complementary skills and insights to support team building. For example, deficient areas may also be identified where skills in a certain group are lacking as indicated by responses outside of the group.

Figure 5B:
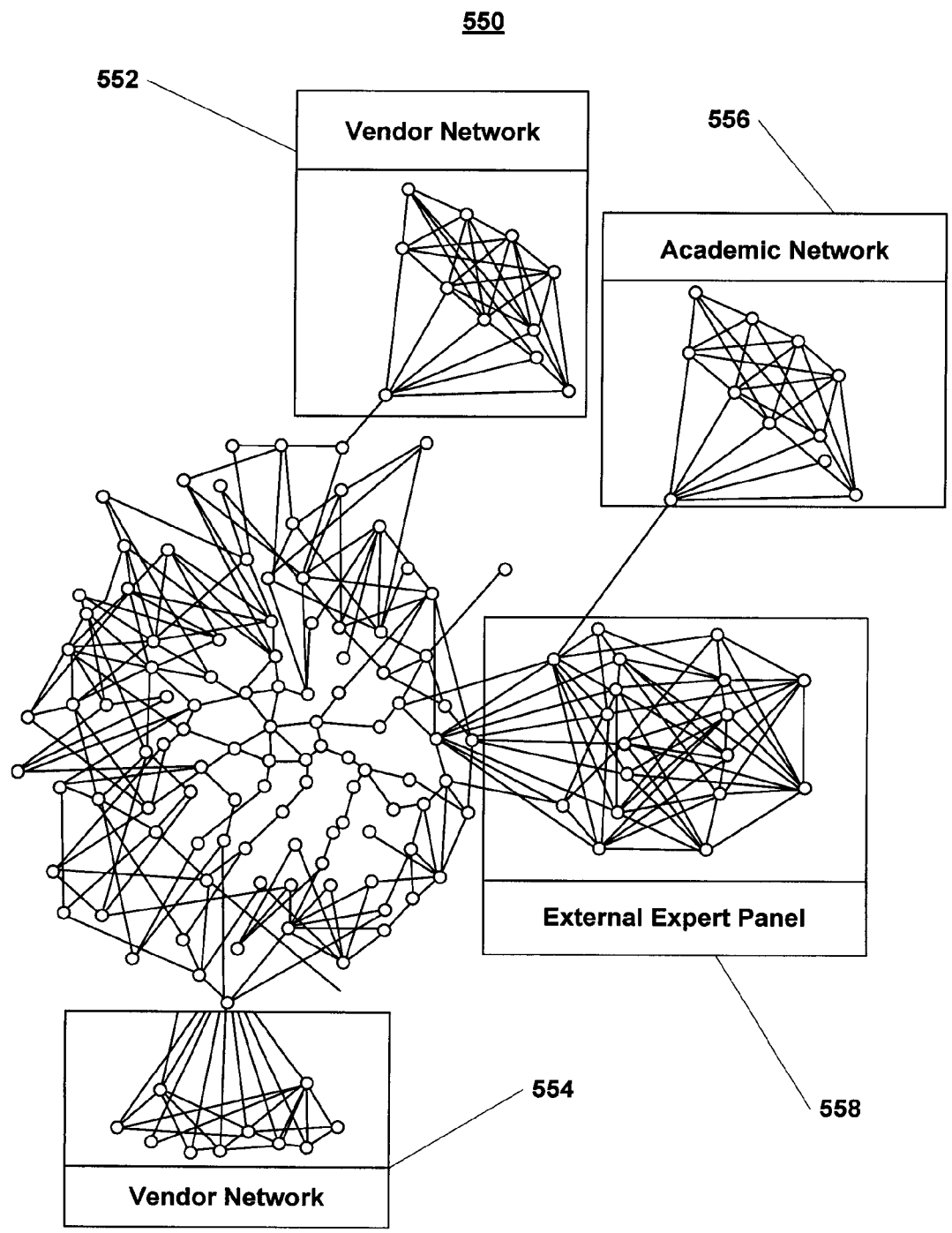
FIG. 5B depicts a second graph of skill exchange system interconnections showing connections to external networks according to an exemplary embodiment.

FIG. 5B depicts a second graph of skill exchange system interconnections showing connections to external networks according to an exemplary embodiment. The graph 550 may represent the interactions amongst participants in an entity, such as a corporation. The graph 550 is meant to be exemplary only, as a variety of other graphs are possible to display the interaction data. Highlighted in the graph 550, are connections to external entities. These external entities may include vendor networks 552 and 554, academic network 556, and external expert panel 558. These external entities may represent third parties that are separate from the entity from which the Ask originates. For some Asks, expertise may not be available internally from an entity. Thus, according to exemplary embodiments, Asks may be routed to external entities as depicted in FIG. 5B. These Asks may be covered under agreements and/or contracts with these external entities to enable the collaboration. The system may have a machine learning feature to learn how certain Asks are routed and thus route those Asks in that manner in the future to the correct entity. For example, the system may learn that the entity lacks certain skill sets. As a result, when an Ask is input requiring such a skill set, the system may remember that a previous similar Ask was routed to one of the external entities, such as the vendor networks 552 and 554, the academic network 556, or the external expert panel 558. It should be understood that some Asks may be complex and may require more than one external entity to be involved.

In some embodiments, Asks may be sent to a user's personal connection network as specified by the user or guided by social media sites. The user may ask friends for advice on generic topics or specify expert groups.

Figure 6:
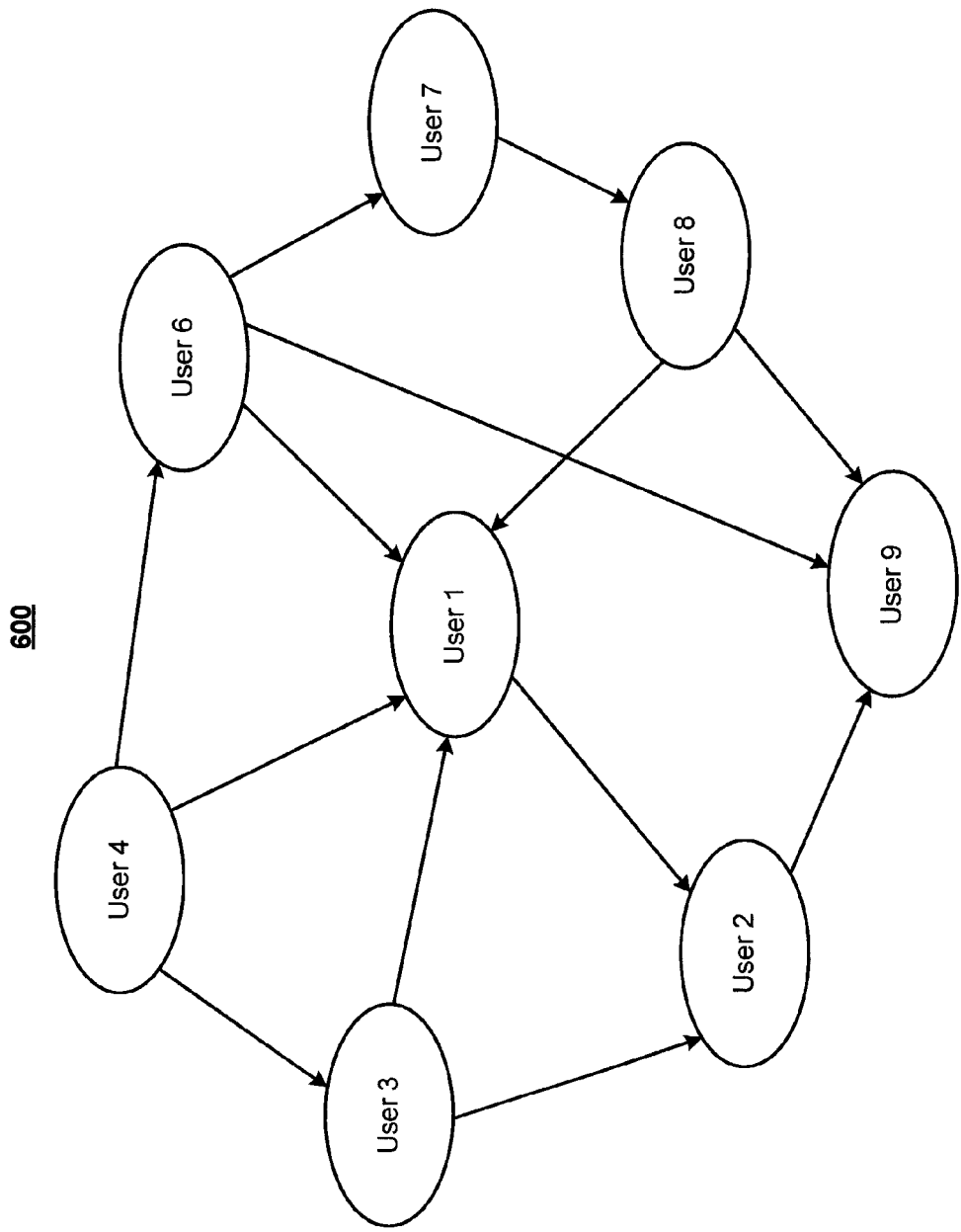
FIG. 6 depicts a graphical representation of users and Asks according to an exemplary embodiment.

FIG. 6 depicts a graphical representation of users and Asks according to an exemplary embodiment. The graph 600 may have the following components: each vertex represents Users <U1, U2, . . . UN>; each edge represents the Net Ask flow <A1, A2, . . . Ak>; directional connectivity: Edge E<Ui,Uj> and net flow of Asks between user <i,j>; edge coloring for the type/category of Ask <T1, TM>. The graph 600 may be displayed for users as a firm-wide skill exchange graph and may be dynamically updated at run time. The graph 600 is meant to be exemplary only as there may be a greater or smaller number of users and a variety of different interconnections, i.e., Ask flows, are possible. Each edge of the graph 600 may be color coded based on the skill or category type.

Each user may have a profile. The profile information may be based at least in part on the graph 600 information. The profile may be based on the historical profile of Asks from each user and may have a skill profile vector. A skills function of tasks types and points; and the skill profile vector can be weighed by the number of points/importance of the Ask. Accordingly, Asks may be broadcast based on the skill profile vector. The broadcast may be to a sub-graph of the graph 600 of a minimum size that is proportional to the importance/points of the Ask.

The graph 600 may also enable the identification of Ask patterns that may enable prediction of Ask based on the historical behavior. Also, multi-hub Ask resolution may be done where a new Ask can be spawned off the original.

Similar to the graph 600 is a missing skill graph. This graph may be similar to that of the graph 600 but may indicate missing skills. It may be specific to certain missing skills where a collection of other/similar skills are covered already. This missing skills graph may be used for Ask routing of a complex Ask that may be decomposed into smaller Asks so that any missing skills for a candidate profile are taken into consideration. It may also be used for training and team building activities.

Figure 7A:
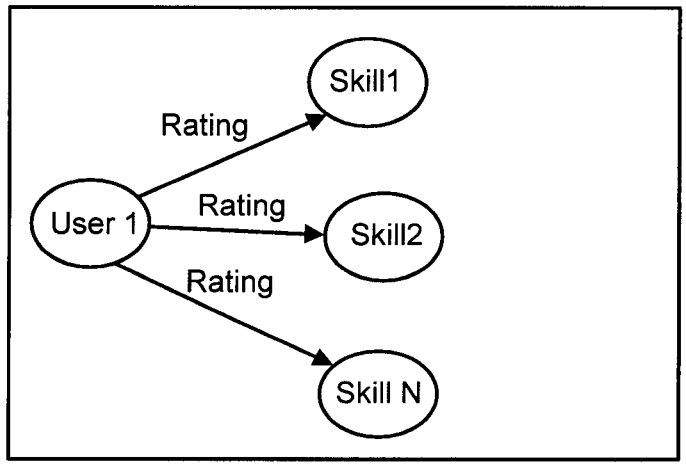
FIGS. 7A through 7E depict graphical representations of users and Asks according to an exemplary embodiment.
Figure 7B:
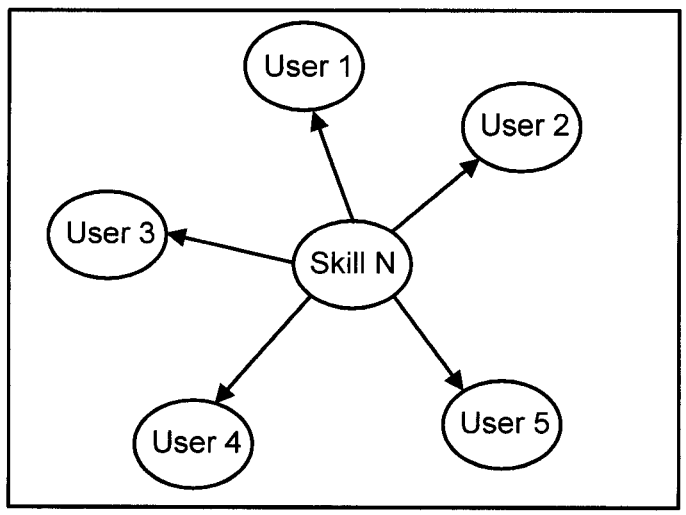
Figure 7C:
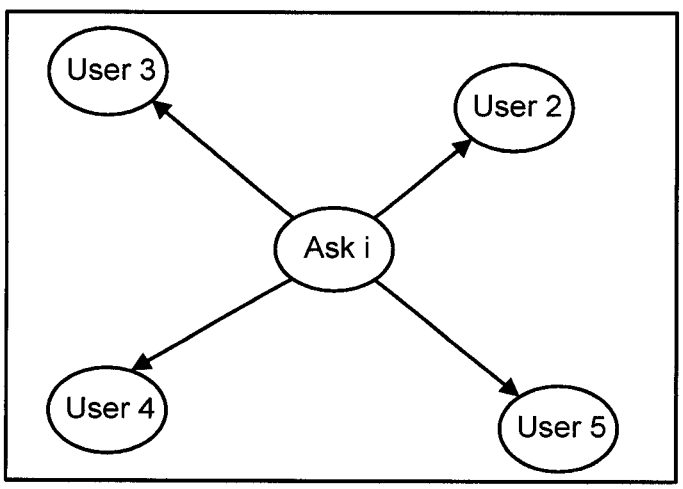

FIGS. 7A through 7E depict graphical representations of users and Asks according to an exemplary embodiment. These figures are meant to be exemplary only as a variety of other representations are possible. In exemplary embodiments, each user User i has associated skills <S1, S2, . . . SN> represented in graph form as depicted in FIG. 7A. Similarly each skill SN is connected to a set of users <User 1-User N> with rankings associated with each connection as depicted in FIG. 7B. Accordingly, for each new simple Ask the system may scan the graphs and identify connected users with corresponding ratings as possible responders to the Ask as depicted in FIG. 7C. A simple Ask may be an Ask that requires a single skill set to accomplish. The graphical representation may be used to support the back-end infrastructure of the skill exchange platform. The edges, skills and connectivity information may be dynamically updated based on the Ask and Response history. Sub sets of skills may time out after being inactive for an elongated period of time.

A complex Ask may require multiple skill sets to accomplish. Each new complex gets submitted to the system for a given category. Then, based on the stored specifications of the Ask, the complex is decomposed into a set of skills <S1, S2, . . . SN> with corresponding weights <w1, w2, . . . wn>.

A sub-graph is extracted for the complex Ask based on the decomposition of skills and weight factors. The resulting users connected to the graph shows potential responders (with both importance of the skill and the users rating factored into the connectivity weight).

If an Ask matches completely with a previously recorded/historical Ask data with successful response behavior, then the system routes the present Ask in a similar fashion (within time thresholds and load balancing rules). Thus, the system may use past behavior as a predictor/response to present behavior. If the Ask does not match (or the time/balancing conditions are active), then: 1. Single user response—Ask gets routed to the user with the highest connection weight and all required skills, 2. Multi user response—Ask gets routed to a set of users by dividing the ask to smaller asks and repeating the process, or 3. Gamified user response—Ask gets routed to a set of users with team building privileges. Here, User 1 and User 2 start competitive mode. A deadline is agreed to by both users to collect points through Asks. Users are ranked at the completion of the time frame and winner gets extra points.

Other embodiments may involve a deadline based Ask assignment and require mapping the flow chart of a complex Ask to a list of users with matching skills and performance estimates to meet the specified deadline.

Figure 7D:
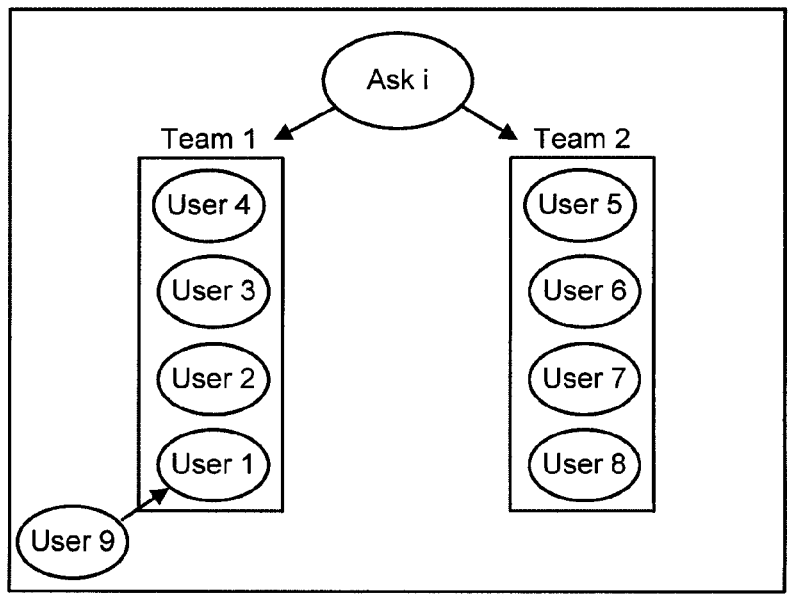
Figure 7E:
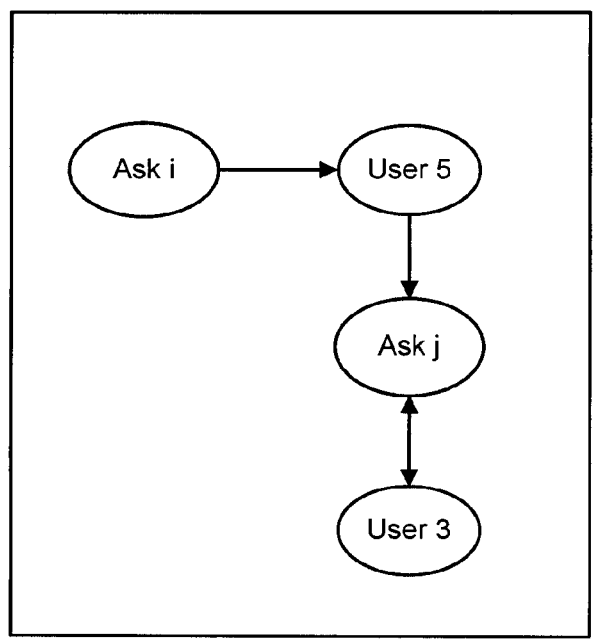

FIG. 7D depicts an adversary-based gamification of the complex Ask (i) with teams. The Ask (i) gets routed to competitive teams Team 1 and Team 2. With team players <t1, t2, . . . tn> and total skill values of <S1, S2, . . . SN>, the teams are auto selected by the system based on the skill match. Each team can add more players to their team but will share points accordingly FIG. 7E depicts a multi-hub routing of an asks based on teaming. An Ask (i) gets routed to User 5. User 5 identifies missing skill or new/previously unidentified task in the Ask (i). User 5 then creates a new Ask (j) out of the original Ask (i) and submits to the system. A responder (e.g., User 3) to the new Ask (j) gets partial points out of the original ask. In some embodiments, the system may check the original and spawned Asks to ensure they are not identical.

Figure 8A:
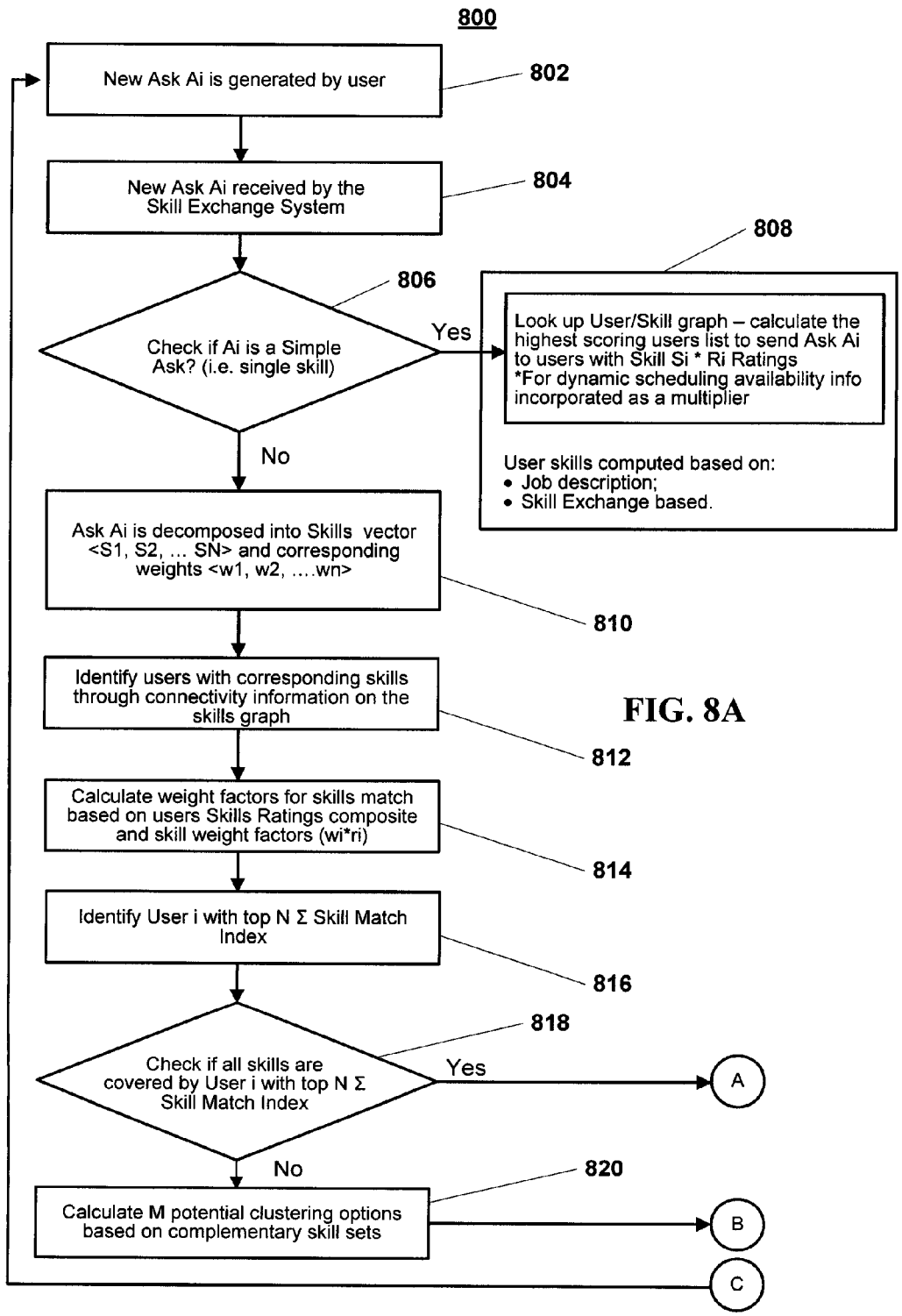
FIGS. 8A and 8B are a flow chart of a method for a skill exchange platform according to exemplary embodiments.
Figure 8B:
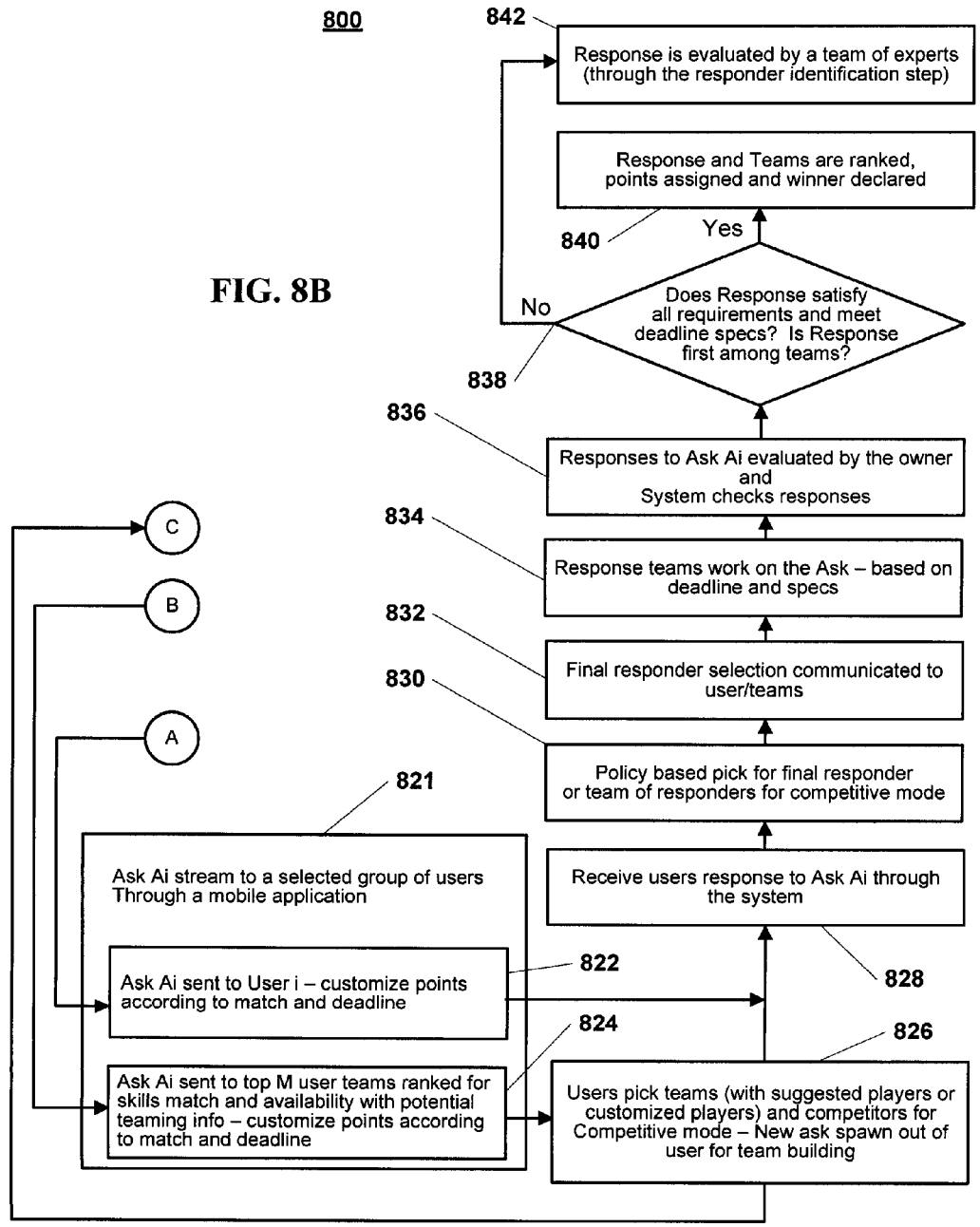

FIGS. 8A and 8B are a flow chart of a method for a skill exchange platform according to exemplary embodiments. The method 800 may represent a method using the embodiments described in FIGS. 5 through 7.

At block 802, A new Ask Ai is generated by user. The Ask Ai may be generated in a Skill Exchange System, such as described herein, for example. The Ask Ai may include a variety of information. For example, the Ask Ai may include category, top skills required, points, and deadline.

In another embodiment, a new Ask Ai may be generated by the system, automatically.

At block 804, the new Ask Ai is received by the Skill Exchange System.

At block 806, a check is performed to test if Ask Ai is a simple Ask. A simple Ask may be an Ask for which a single skill is required. A simple Ask may not require decomposition and thus, single step routing may be possible.

At block 808, if Ai is a simple Ask, then the User/Skill graph is looked up and a calculation is made of the highest scoring users list (e.g., top N). This list may be the list that Ask Ai is sent to. In some embodiments, users with Skill Si*Ri Ratings may be used for dynamic scheduling availability information incorporated as a multiplier. The user skills may be computed based on job description (e.g., HR/Management, level, yearly evaluation based) and skill exchange based (e.g., based on responses to asks, Points/honors/badges achieved in skill exchange system).

At block 810, if the Ai is not a simple Ask, then the Ask Ai is decomposed into skills vector <S1, S2, . . . SN> and corresponding weights <w1, w2, . . . wn>. This decomposition may be based on a Skill Exchange Knowledgebase that contains similar/historical Asks and category information.

At block 812, users are identified with corresponding skills through the connectivity information on the skills graph. For example, skills graphs as depicted herein may be used such as depicted in FIG. 7A.

As described above, the skill exchange platform may have a graph database implementation of the individual users, including skills, Ask histories, responses, tasks and history information, etc. This database may be dynamically updated every time an Ask is submitted to the system and every time an Ask is responded to, for example. In one embodiment, the corresponding graph can be created for an enterprise where different sub-graphs represent different expertise groups. For example, in one embodiment, one expertise group may be Java developers or New Hires or Japanese derivative experts. Such sub-graphs may be tightly connected through frequent Ask/Response relationships. Furthermore the user can create his or her own preferred connection graph or trusted network to send the Asks to.

In another embodiment, an enterprise skill exchange graph may be connected to other external graphs, such "vendor expert networks", "academic networks", and "external expert panels", as shown in FIG. 5B. Specialized rules and weight factors may be specified for such external graph networks. When an Ask matches the expertise or skills vectors of the external connection networks, it can be sent to such networks after security and compliance clearance processes. Different point systems may be assigned depending on the agreements and/or contracts and/or relationships with such external entities.

At block 814, weight factors for skills match are calculated based on users Skills Ratings composite and skill weight factors (wi*ri).

At block 816, the User i with the top N$\Sigma$Skill Match Index is identified. It is important to note that this is one embodiment of the policy used to implement the skill exchange matching of exemplary embodiments. In different companies or other general use cases, different policies may be used and can be implemented accordingly.

At block 818, it is checked if all skills are covered by User i with top N$\Sigma$Skill Match Index (as identified in block 816).

At block 820, if the skills are not all covered, then calculate M potential clustering options based on complementary skill sets.

In another embodiment, the matching can be performed at the task level instead of skill level. If the user has performed a task successfully in the past, but does not have the skill level, and all tasks required to complete the ask are covered similarly by the users task coverage history, then the user can be identified as a match.

At block 821, encompassing blocks 822 and 824, the Ask Ai is streamed to the selected group of users through a mobile application with specialized settings such as availability, policy, and preferences. For example, a user may choose to not receive any ask requests close to end of quarter; user may choose to receive asks with points >1000; Deadlines >1 week. The users may also be selected based on calendar availability, vacation/travel schedule, and other corporate calendar availability information. The availability information may also be acquired from project databases and other sources in the entity. These examples are meant to be exemplary and non-limiting.

At block 822, if the skills are covered, then Ask Ai is sent to User i. The points may be customized according to match and deadline.

At block 824, the Ask Ai is sent to top M user teams ranked for skills match and availability with potential teaming info. The points may be customized according to match and deadline.

At block 826, the users may pick teams (with suggested players or customized players) and competitors for competitive mode. A new Ask may spawn out of the user for team building as part of the team building process.

At block 828, the originator of the Ask Ai may receive the users response to Ask Ai through the system.

At block 830, a policy based pick for the final responder or team of responders may occur for competitive mode. This step may be optional, as the originator may select the responders manually.

At block 832, the final responder selection is communicated to user/teams.

At block 834, the response teams or user work on the Ask based on the deadline and specifications.

At block 836, the responses to Ask Ai are evaluated by the owner and the Skill Exchange System checks the responses.

At block 838, does response satisfy all requirements and meet deadline and specification? Is response first among teams?

At block 840, if yes from block 838, then the response and reams are ranked and points assigned, and a winner is declared.

At block 842, if no from block 838, then the response is evaluated by a team of experts (through the responder identification step).

When the Ask is declared completed by the system, the user may grant the points from his/her account to the responder(s) account(s). The points may be deducted from the Ask owner and allocated to the responder(s) based on the rules specified by the game. The user can earn more points by responding to Asks, which can then be used to submit other Asks to the system. In some embodiments, when the user runs out of points he/she cannot submit more asks to the systems without earning points.

In one embodiment, the system may grant default points to individual users at the beginning/set up phase. These points can be used to submit a limited number of Asks.

Points may be linked to different skill sets and the resulting points in a specific field/skill set can be translated to badges of honor or other indicia, as described above. These indicia may represent expertise in a specific technical or non-technical field. In another embodiment, the points can be used for leadership boards. The points can be displayed on the users phone book, corporate or social media home page, as shown in FIG. 4, for example.

The points earned can be translated to number of different rewards in different embodiments. In one embodiment the user may use the points purely for charity or community or outreach activities.

In another embodiment, the points can be translated to performance markers for employees year end evaluation or bonus consideration. In another embodiment, the points can be translated to employee discounts provided by external vendors. In another embodiment, the points can be used for conference registration or other employee privileges. These embodiments are meant to be exemplary and non-limiting as other embodiments are possible.

Figure 9:
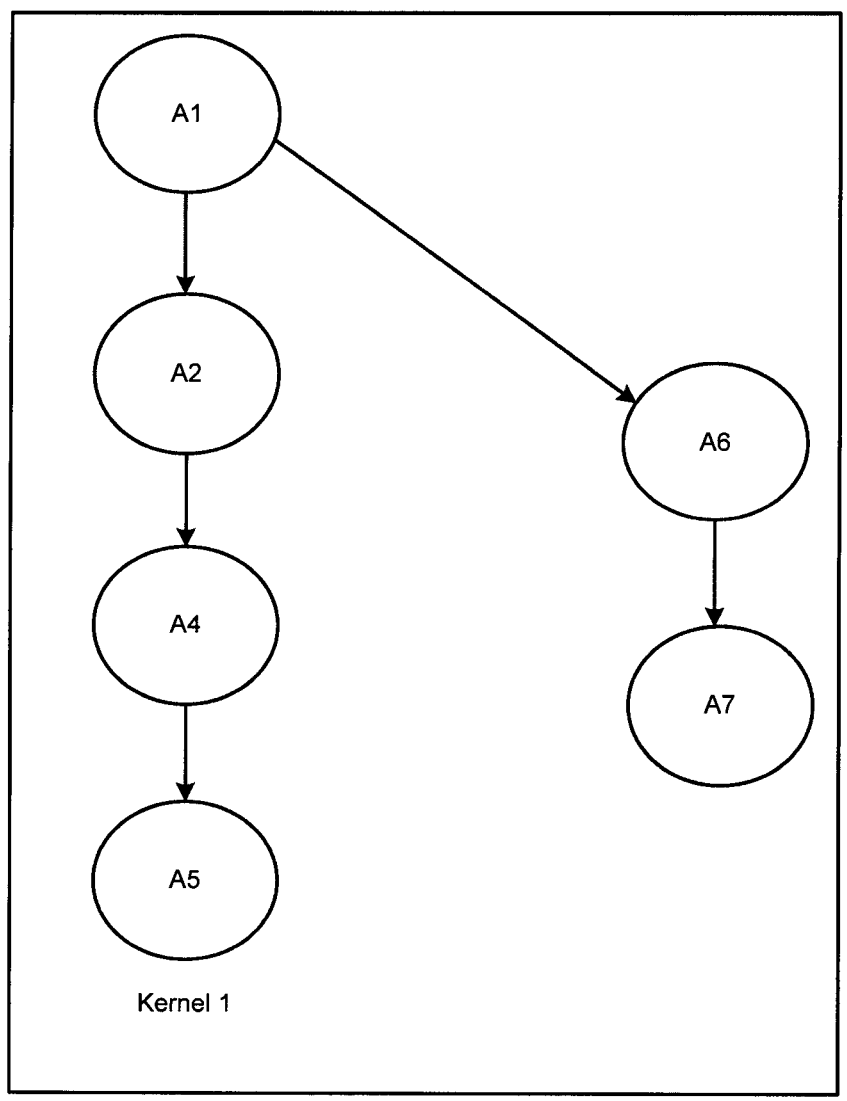
FIG. 9 depicts a skill exchange graph for predictive task allocation according to any exemplary embodiment.

FIG. 9 depicts a skill exchange graph for predictive task allocation according to an exemplary embodiment. The graph 900 may be used for predictive task allocation. FIG. 9 is meant to be exemplary only. Given the task flows over time on the skill exchange graph implemented in a firm-wide skill exchange platform and mobile skill exchange app, the following may be performed:

Identify Task Kernels—i.e., super graphs of tasks with specific ordering and data connectivity through statistical analysis techniques. Super task graphs are typically clustered around a specific topic. The kernels may be Asks or they can be at a task level.

Create a library of super task graphs (Task Kernels) which can also be categorized and structured with expert input.

Each such library element can be used to identify the steps that need to be taken to complete a complex task, expected duration, standard flow of steps/loops, problem/challenges. etc.

For each Ask being executed in the system, look up if it matches any task kernel in the system by accessing the kernel library.

Predict the next Ask and type of next Ask (and or Asks) based on the Ask history profile and super task library.

Use predicted value to provision resources and for scheduling decisions to optimize resources and meet all deadlines.

For each library a dynamic list of potential responders can be maintained depending on the priority level, performance and deadline requirements.

Figure 10:
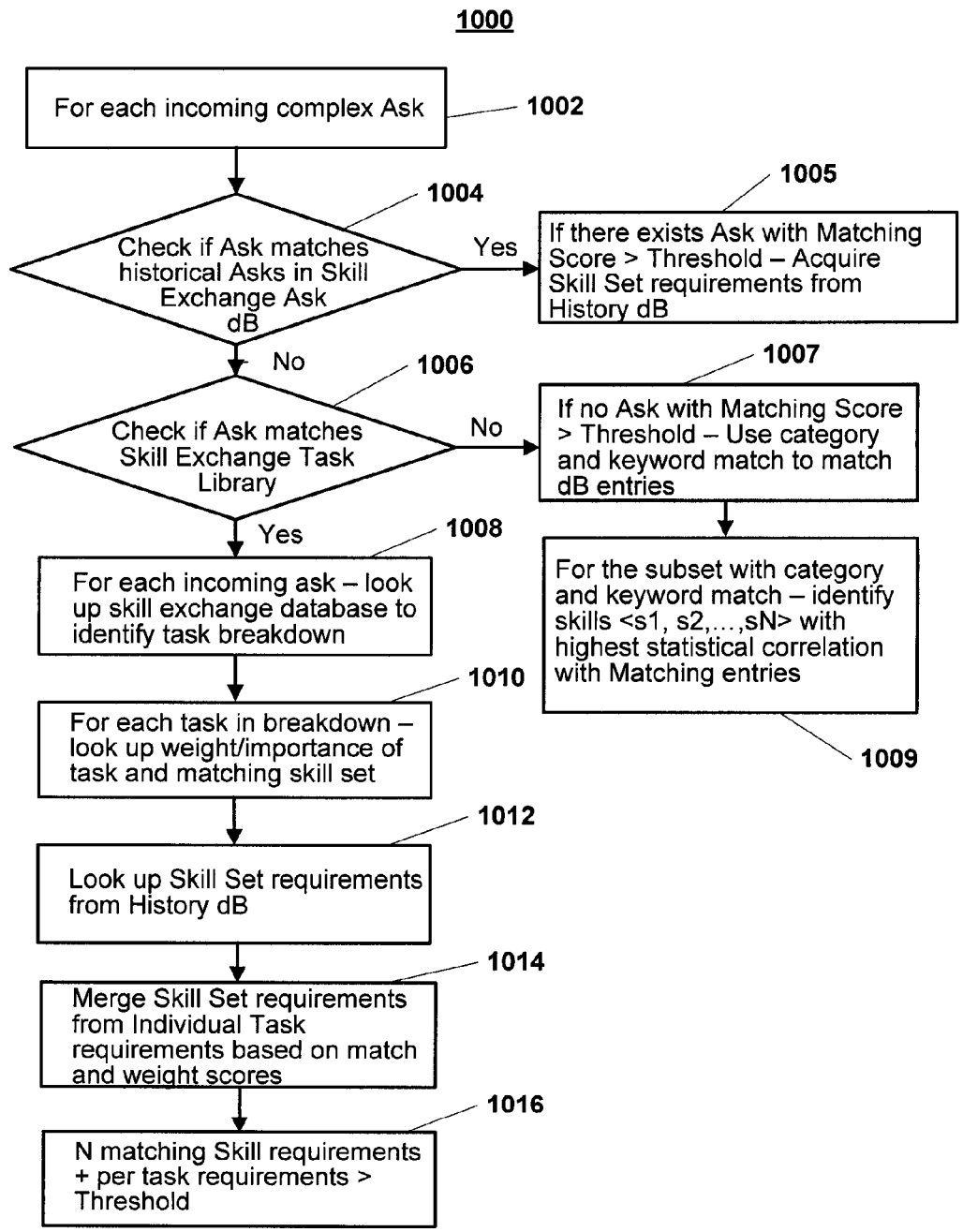
FIG. 10 is a flow chart of a method for complex Asks according to exemplary embodiments.

FIG. 10 is a flow chart of a method for complex Asks according to exemplary embodiments.

At block 1002, the method 1000 begins and is applied for each incoming complex Ask.

At block 1004, a check is performed to see if the Ask matches historical Asks in Skill Exchange Ask dB. If yes, then at block 1005, if the Ask has a Matching Score>Threshold then the Skill Set requirements are acquired from a History dB.

At block 1006, a check is performed to see if the Ask matches the Skill Exchange Task Library. At block 1007, if no Ask with Matching Score>Threshold, the category and keyword match may be used to match dB entries.

At block 1008, for each incoming task at this step, a look-up in the skill exchange database is performed to identify the task breakdown.

At block 1009, for the subset with category and keyword match, a skills <s1, s2, . . . ,sN> vector is identified with highest statistical correlation with matching entries.

At block 1010, for each task in the breakdown, the weight/importance of the task and matching skill set are looked up.

At block 1012, a look-up is performed for the Skill Set requirements from the History dB.

At block 1014, the Skill Set requirements from Individual Task requirements are merged based on match and weight scores.

At block 1016, N matching Skill requirements+per task requirements>Threshold is checked.

Figure 11A:
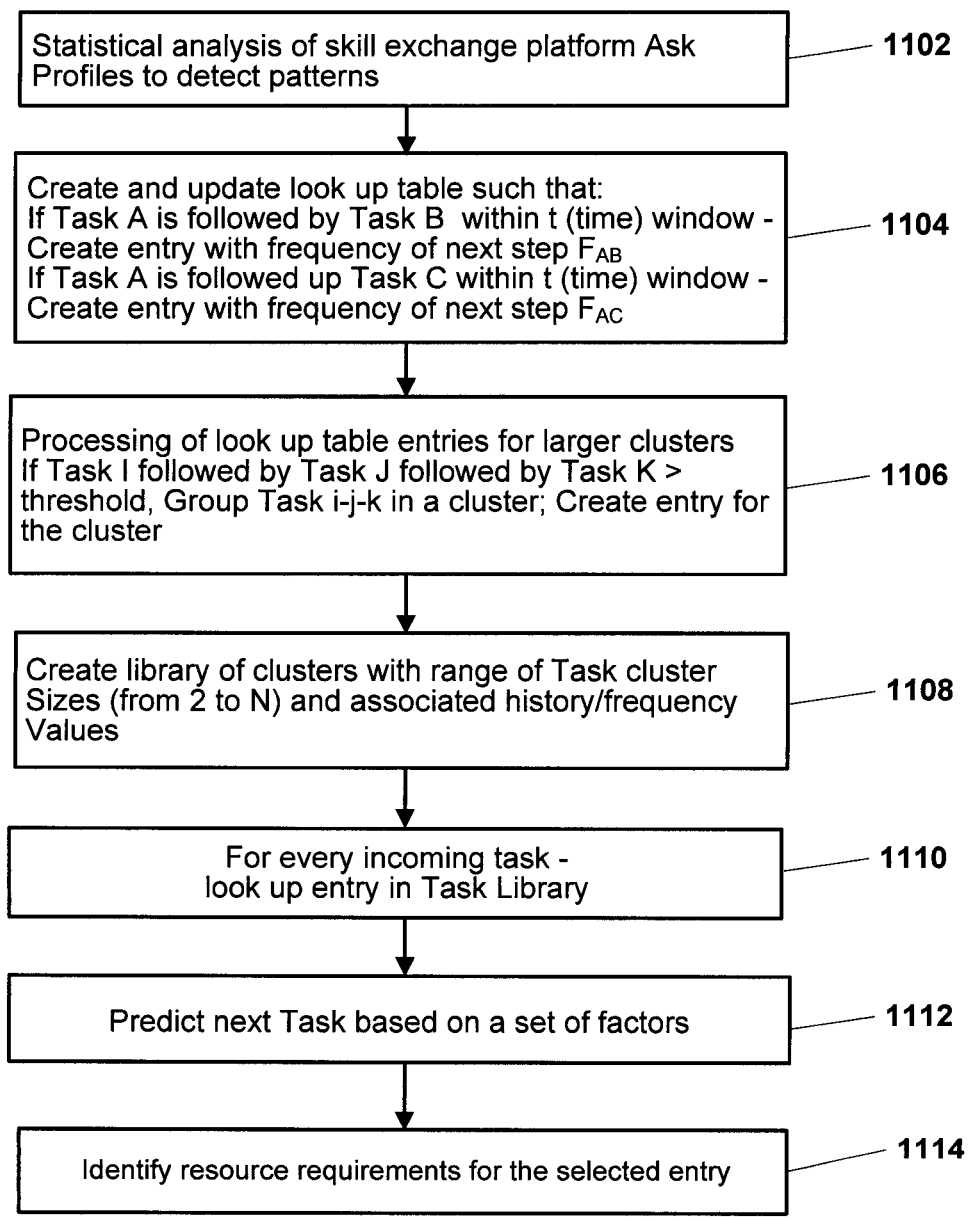
FIG. 11A is a flow chart of a method for predictive task allocation according to exemplary embodiments.

FIG. 11A is a flow chart of a method for predictive task allocation according to exemplary embodiments. The method 1100 may represent a method using the embodiment described in FIG. 9.

At block 1102, a statistical analysis of skill exchange platform Ask Profiles is conducted to detect patterns.

At block 1104, a look up table is created (depicted in FIG. 11B at 1120 in an exemplary format) and updated such that:

if Task A is followed by Task B within t (time) window—create entry with frequency of next step $F_{AB}$; if Task A is followed up Task C within t (time) window—create entry with frequency of next step $F_{AC}$.

At block 1106, processing of the look up table entries for larger clusters is performed such that: if Task I followed by Task J followed by Task K>threshold, Group Task i-j-k in a cluster and create an entry for the cluster.

At block 1108, a library of clusters (depicted in FIG. 11B at 1130 in an exemplary format) is created with a range of Task cluster sizes (from 2 to N) and associated history/frequency values.

At block 1110, for each incoming task, look up entry in Task Library.

At block 1112, a prediction for the next Task is made. This prediction may be based on a set of factors. For example, exemplary factors may include history behavior, task characteristics, and independent input to the skill exchange system.

At block 1114, resource requirements for the selected are identified based a set of factors. For example, exemplary factors may include frequency, phase behavior, time, etc.

Figure 12A:
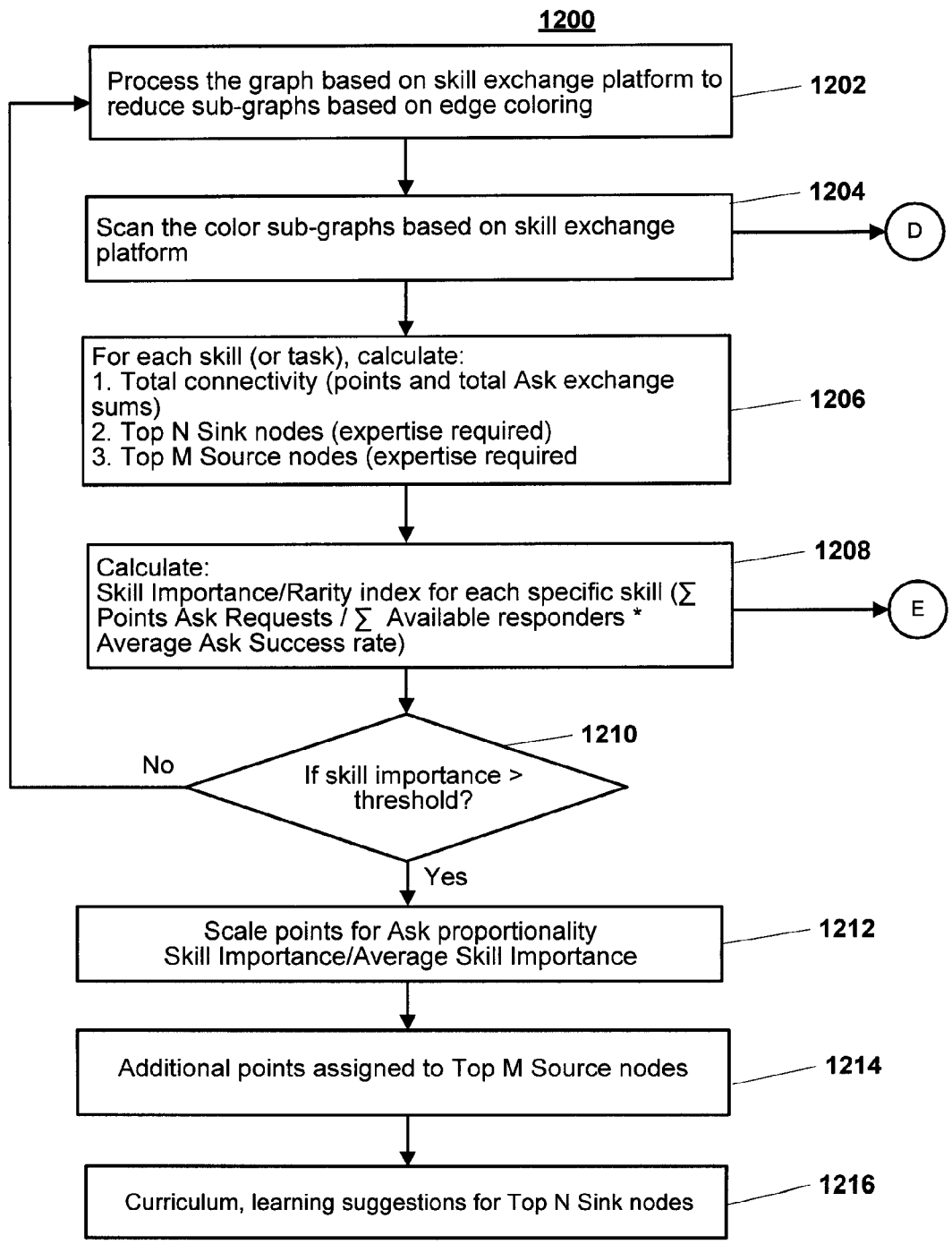
FIGS. 12A, 12B, and 12C are flow charts of a method for skill graph processing according to exemplary embodiments.
Figure 12B:
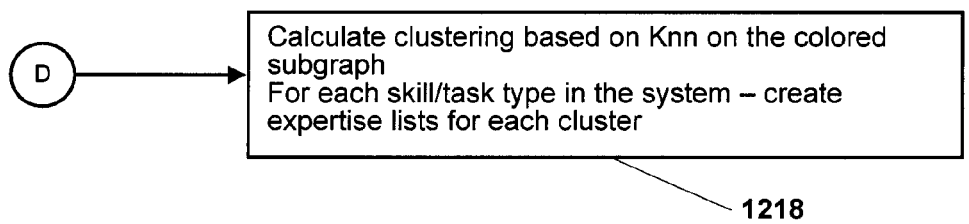
Figure 12C:
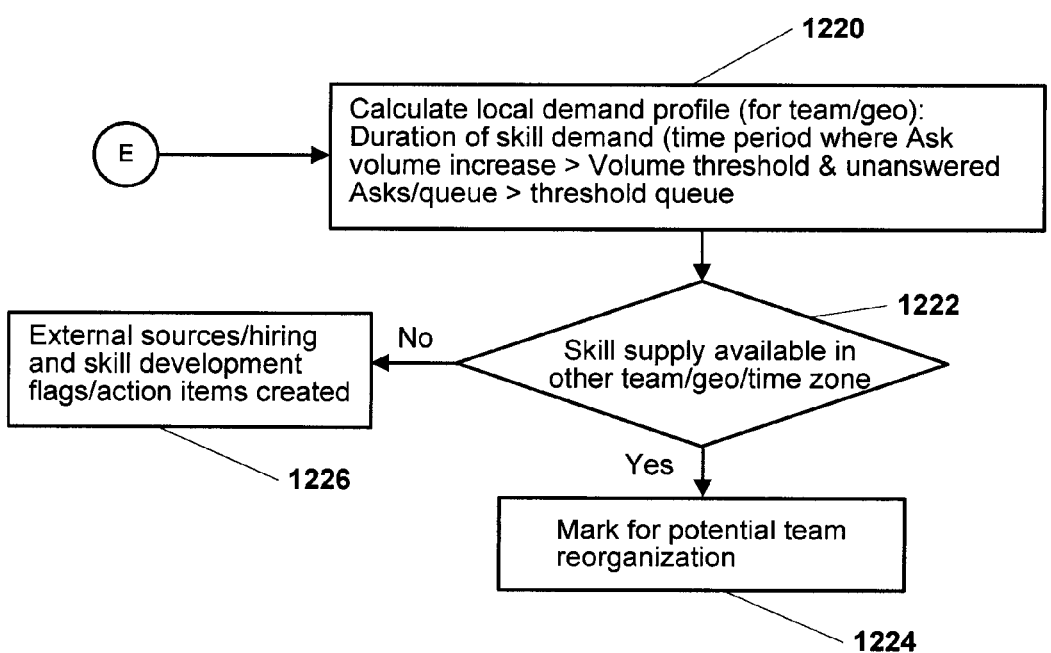

FIGS. 12A, 12B, and 12C are flow charts of a method for skill graph processing according to exemplary embodiments.

As described above, an entity-wide skill exchange map can be created with run-time source/sink, task and priority data can be used for variety of uses such as hiring and team building decisions, identifying on-demand, or missing skill sets, as well as establishing an entity-wide Ask knowledge base. Exemplary embodiments may further promote the identification of topic experts in individual fields. Accordingly natural clustering of skill groups where high connectivity occurs due to frequent ask/response pairs may be identified and formed. For example, a firm wide NoSQL special interest group may be identified and formed where one previously did not exist. Employees get automatically ranked for skills and expertise through the response to asks. For any rare skill with high importance, a list of potential responders may be identified by the system. Such responders and skills may be automatically ranked against other skills in the system. When the system identifies that these skills are rare and important skills corresponding Ask points will be adjusted to reflect this. Such users may be marked by the skill exchange system due to their highly important skills/knowledgebase. The dynamic updates in the skill exchange platform may indicate emerging topics that will guide hiring decisions. If the skill exchange platform experiences a flux of Asks in an emerging technology related topic, this may be used to guide hiring decisions for personnel with corresponding expertise or entering into an agreement with a vendor or other third party expert to provide this skill or expertise.

Similarly, text analytics can be used to dynamically track the emerging topics, location of technical problems, sink/source profiles to dynamically allocate resources across the firm. If the networking Asks are spiking in the datacenters in location A, and all the responses are coming from the networking experts in datacenters in location B, the resulting team structure may be changed such that the experts with the skills are moved to the locations with highest skill demand.

At block 1202, the skill exchange map or graph is processed to reduce sub-graphs based on edge coloring.

At block 1204, the color sub-graphs are scanned.

At block 1206, for each skill (or task), the following is calculated: 1. Total connectivity (points and total Ask exchange sums), 2. Top N Sink nodes (expertise required), 3. Top M Source nodes (expertise required).

At block 1208, the following are calculated: skill importance/rarity index for each specific skill (ΣPoints Ask Requests/ΣAvailable responders*Average Ask Success rate).

At block 1210, a determination is made if skill importance>threshold. If the skill importance is not above a certain threshold, then a loop is made back to the first step, and the method continues scanning for the next skill importance in the system At block 1212, the points are scaled for Ask proportionality skill importance/average skill importance.

At block 1214, additional points are assigned to Top M source nodes.

At block 1216, curriculum, learning suggestions are assigned for Top N sink nodes.

At block 1218, clustering based on Knn (K Nearest Neighbor connectivity) is calculated on the colored subgraph. For each skill/task in the system, expertise lists for each cluster are created.

At block 1220, a local demand profile is calculated based on the duration of the skill demand (the time period where the Ask volume increases>volume threshold and the unanswered Asks/queue>threshold queue.

At block 1222, an assessment as to whether the skill supply is available in another team/location/time zone is made.

At block 1224, if yes, then a mark is made for potential team reorganization.

At block 1226, if no, then flagged action items are created for potential external sources or hiring or skill development to fulfill the need.

Hereinafter, aspects of implementation of the embodiments will be described. As described above, the method of the embodiments may be computer implemented as a system. The system of the embodiments or portions of the system of the embodiments may be in the form of a "processing machine," for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The description of exemplary embodiments describes servers, portable electronic devices, and other computing devices that may include one or more modules, some of which are explicitly depicted in the figures, others are not. As used herein, the term "module" may be understood to refer to executable software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices (e.g., servers) instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, portable electronic devices, client devices, computers, etc.) separately. The functions described as being performed at various components may be performed at other components, and the various components may be combined and/or separated. Other modifications also may be made.

According to exemplary embodiments, the systems and methods may be computer implemented using one or more computers, incorporating computer processors. The computer implementation may include a combination of software and hardware. The computers may communicate over a computer based network. The computers may have software installed thereon configured to execute the methods of the exemplary embodiments. The software may be in the form of modules designed to cause a computer processor to execute specific tasks. The computers may be configured with hardware to execute specific tasks. As should be appreciated, a variety of computer based configurations are possible.

The processing machine described above may also utilize any of a wide variety of other technologies including a special purpose computer, a computer system including a microcomputer, mini-computer or mainframe for example, a programmed microprocessor, a micro-controller, a PICE (peripheral integrated circuit element), a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices for example capable of implementing the steps of the process of the embodiments.

It is appreciated that in order to practice the method of the embodiments as described above, it is not necessary that the processors and/or the memories of the processing machine be physically located in the same geographical place. For example, each of the processors and the memories and the data stores used in the embodiments may be located in geographically distinct locations and connected so as to communicate in any suitable manner. Additionally, it is appreciated that each of the processor and/or the memory and/or data stores may be composed of different physical pieces of equipment. Accordingly, it is not necessary that the processor be one single piece of equipment in one location and that the memory be another single piece of equipment in another location. For example, it is contemplated that the processor may be two or more pieces of equipment in two or more different physical locations. These two or more distinct pieces of equipment may be connected in any suitable manner. Additionally, the memory may include two or more portions of memory in two or more physical locations. Additionally, the data storage may include two or more components or two or more portions of memory in two or more physical locations.

To explain further, processing as described above is performed by various components and various memories. However, it is appreciated that the processing performed by two distinct components as described above may, in accordance with a further embodiment of the embodiments, be performed by a single component. Further, the processing performed by one distinct component as described above may be performed by two distinct components. In a similar manner, the memory storage performed by two distinct memory portions as described above may, in accordance with a further embodiment of the embodiments, be performed by a single memory portion. Further, the memory storage performed by one distinct memory portion as described above may be performed by two memory portions. It is also appreciated that the data storage performed by two distinct components as described above may, in accordance with a further embodiment, be performed by a single component. Further, the data storage performed by one distinct component as described above may be performed by two distinct components.

Further, various technologies may be used to provide communication between the various processors and/or memories, as well as to allow the processors and/or the memories of the embodiments to communicate with any other entity; e.g., so as to obtain further instructions or to access and use remote memory stores, for example. Such technologies used to provide such communication might include a network, such as a computer network, for example, the Internet, Intranet, Extranet, LAN, or any client server system that provides communication of any capacity or bandwidth, for example. Such communications technologies may use any suitable protocol such as TCP/IP, UDP, or OSI, for example. It should be appreciated that examples of computer networks used in the preceding description of exemplary embodiments, such as the Internet, are meant to be non-limiting and exemplary in nature.

As described above, a set of instructions is used in the processing of the embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming or any other suitable programming form. The software tells the processing machine what to do with the data being processed.

Further, it is appreciated that the instructions or set of instructions used in the implementation and operation of the embodiments may be in a suitable form such that the processing machine may read the instructions. For example, the instructions that form a program may be in the form of a suitable programming language, which is converted to machine language or object code to allow the processor or processors to read the instructions. For example, written lines of programming code or source code, in a particular programming language, are converted to machine language using a compiler, assembler or interpreter. The machine language is binary coded machine instructions that are specific to a particular type of processing machine, e.g., to a particular type of computer, for example. The computer understands the machine language.

Any suitable programming language may be used in accordance with the various embodiments. Illustratively, the programming language used may include assembly language, ActionScript, Ada, APL, Basic, C, C++, C#, COBOL, Ceylon, Dart, dBase, F#, Fantom, Forth, Fortran, Go, Java, Jquery, Modula-2, .NET, Objective C, Opa, Pascal, Prolog, Python, REXX, Ruby, Visual Basic, X10, and/or JavaScript, for example. Further, it is not necessary that a single type of instructions or single programming language be utilized in conjunction with the operation of the system and method of the embodiments. Rather, any number of different programming languages may be utilized as is necessary or desirable.

Also, the instructions and/or data used in the practice of the embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, e.g., the software for example, that enables the computer operating system to perform the operations described above may be contained on any of a wide variety of computer readable media, as desired. Further, the data for example processed by the set of instructions might also be contained on any of a wide variety of non-transitory media or medium. For example, the particular medium, e.g., the memory in the processing machine, utilized to hold the set of instructions and/or the data used in the embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the embodiments.

Further, the memory or memories used in the processing machine that implements the embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the embodiments, a variety of "user interfaces" may be utilized to allow a user to interface with the processing machine or machines that are used to implement the embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the embodiments, it is not necessary that a human user actually interact with a user interface used by the processing machine of the embodiments. Rather, it is contemplated that the user interface of the embodiments might interact, e.g., convey and receive information, with another processing machine, rather than a human user. Accordingly, the other processing machine might be characterized as a user. Further, it is contemplated that a user interface utilized in the system and method of the embodiments may interact partially with another processing machine or processing machines, while also interacting partially with a human user.

While the embodiments have been particularly shown and described within the framework of financial services, it will be appreciated that variations and modifications may be effected by a person of ordinary skill in the art without departing from the scope of the embodiments. Furthermore, one of ordinary skill in the art will recognize that such processes and systems do not need to be restricted to the specific embodiments described herein. Other embodiments, combinations of the present embodiments, and uses and advantages of the present embodiments will be apparent to those skilled in the art from consideration of the specification and practice of the embodiments disclosed herein. The specification and examples should be considered exemplary.

What is claimed is:

1. A computer implemented method, comprising
receiving, electronically, a submission comprising a request for assistance with a task, the request comprising task information for the task and a request response policy from a requester, the task information comprising an identification of the task and a required skill set for the task, the request response policy identifying a criteria for selecting a response from a responder that is independent of the task information and that is based on a manner in which the response is received;
routing, by a computer processor, the submission to a plurality of potential responders through an electronic stream based on the task information;
receiving, electronically, a response from a plurality of the plurality of potential responders, each response accepting the submission; and
automatically selecting, by the computer processor, one of the responses for the submission based solely on the request response policy;
wherein the manner in which the response is received is based on one or more of the following: a number of points earned by the responder in previous request completion, and a number of points bid by the responder in the response.

2. The method of claim 1, wherein the submission is generated using a mobile application or a desktop widget.

3. The method of claim 1, further comprising:
displaying the submission, following routing, in a streaming interface to the one or more potential responders.

4. The method of claim 1, wherein the task information further comprises one or more of a task duration, a point value, and a deadline for completion of the request.

5. The method of claim 1, wherein the electronic stream comprises a real time dynamically updated listing of a plurality of submissions.

6. The method of claim 4, further comprising:
receiving notification of completion of the request;
verifying the completion of the request;
awarding the responder for the selected response the point value from the request.

7. The method of claim 6, wherein the point value is transferred from the requester to the responder.

8. The method of claim 6, wherein the point value is translated to one or more of volunteer activity, community outreach credit, enterprise discounts, evaluation input, badges, and consideration for bonuses.

9. The method of claim 6, further comprising:
dynamically adjusting the point value for the request based on a rarity of the skill set and the deadline.

10. The method of claim 1, further comprising:
determining if the request is a simple request or a complex request.

11. The method of claim 10, further comprising:
upon determining that the request is a simple request:
  determining one or more skills required to perform the request; and
  performing a look-up in a potential responder/skill graph to calculate the metric based scored potential responders to route the request to,
  wherein the step of routing the submission comprises routing the request to the highest scoring potential responders.

12. The method of 10, further comprising:
upon determining the request is a complex request:
  decomposing the request into a skills vector, containing each required skill, and corresponding weights;
  identifying one or more potential responders with corresponding skills through connectivity information derived from a skills graph;
  calculating a skill matching index based on weight factors for skills matching for each of the one or more potential responders based on a skill rating composite and skill weight factors;
  identifying a set of the one or more potential responders that have the highest skill matching index; and
  verifying that all skills required by the complex request are covered by the set of one or more potential responders,
  wherein the step of routing the submission comprises routing the request to the set of one or more potential responders.

13. The method of claim 12, wherein the skills graph comprises a graphical representation of a skill exchange infrastructure, wherein each node is a user, each edge is a request, and each edge is color coded based on a skill or category type.

14. The method of claim 12, wherein the skills graph further comprises a missing skill graph for request distribution and assignment based on the graphical representation of the skill exchange infrastructure.

15. The method of claim 12, further comprising:
upon not all skills being covered by the set of one or more potential responders;
calculating a set of potential clustering options based on the identified set of one or more potential responders, wherein the clustering options comprise potential teaming arrangements,
wherein the step of routing the submission comprises routing the request to the set of clustering options.

16. The method of claim 12, further comprising:
creating one or more expert subgraphs for each individual skill or skill vector using a customized clustering based on a nearest neighbor;
calculating skill importance and rarity metrics using dynamic skill exchange graphs and history tables;
calculating skill demand for local teams and firm wide; and
calculating flags for reorganization, team building, and skill development actions based on the customized clustering.

17. The method of claim 4, further comprising:
wherein routing the submission to the one or more potential responders further comprises distributing the submission based on an indicated availability of the one or more potential responders to meet both the deadline and the skill set.

18. The method of claim 1, further comprising:
wherein routing the submission to the one or more potential responders further comprises distributing the request to an external network based on skill matching, cost, and request history information, and wherein the external network comprises at least one of an external expert network and an academic network.

19. A system, comprising:
one or more end user devices, wherein the end devices comprising computing devices;
one or more servers, communicatively coupled to the one or more end user devices through a network;
one or more databases, communicatively coupled to the one or more servers and the one or more end user devices, comprising: skill exchange information, user profiles, request profiles, historical requests, and policies that guide creation, distribution, response, security, compliance, and privacy of a request for assistance for assistance with a task;
the one or more servers having at least one computer processor and computer memory comprising computer-readable instructions which when executed by the at least one processor cause the at least one processor to perform the steps comprising:
receiving an electronic submission comprising the request, the request comprising task information for the task and a request response policy from a requester that originates from one of the one or more end user devices, the task information comprising an identification of the task and a required skill set for the task, the request response policy identifying a criteria for selecting a response from a responder that is independent of the task information and that is based on a manner in which the response is received;
routing the submission to a plurality of potential responders based on the task information through an electronic stream such that the electronic stream is displayed in a streaming interface and the routing is to one or more of the one or more end user devices associated with the one or more potential responders;
receiving a response from a plurality of the plurality of potential responders; and
automatically selecting one of the responses for the submission based solely on the request response policy;
wherein the manner in which the response is received is based on one or more of the following: a number of points earned by the responder in previous request completion, and a number of points bid by the responder in the response.

20. The system of claim 19, wherein the user profile comprises a user skill profile comprising a history of requests responded to by the user, success rate in completing requests of the user, a performance rating of the user, an activity level of the user, a first skill set of the user comprising a skill vector based on a job description associated with the user, a second skill set of the user comprising a skill vector based on a skill exchange system, the availability of the user to respond to the request, and behavior pattern of the user in responding to historical requests.

21. The system of claim 19, wherein the task information further comprises one or more of a task duration, a point value, and a deadline for completion of the request.

22. The system of claim 19, wherein the electronic stream comprises a real time dynamically updated listing of a plurality of submissions.

23. The system of claim 21, further comprising:
receiving notification of completion of the request;
verifying the completion of the request;
awarding the responder for the selected response the point value from the request.

24. The system of claim 19, further comprising:
a task kernal library that comprises historical data of requests and tasks;
a predictive algorithm which uses the task kernal library and request history database to predict a next set of requests given a current state of the system; and
a machine learning technique which learns each task kernal in the task kernal library and task sequences dynamically from data in the one or more databases.

\* \* \* \* \*